(12) United States Patent
Aoki et al.

(10) Patent No.: US 8,189,268 B2
(45) Date of Patent: May 29, 2012

(54) LENS UNIT

(75) Inventors: Takashi Aoki, Miyagi (JP); Yoichi Iwasaki, Miyagi (JP); Kenji Hoshino, Miyagi (JP); Takayuki Matsuura, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 94 days.

(21) Appl. No.: 12/749,198

(22) Filed: Mar. 29, 2010

(65) Prior Publication Data

US 2010/0246024 A1 Sep. 30, 2010

(30) Foreign Application Priority Data

Mar. 30, 2009 (JP) .................................. 082182/2009

(51) Int. Cl.
*G02B 15/02* (2006.01)
*G02B 7/02* (2006.01)
*G02B 21/02* (2006.01)

(52) U.S. Cl. ........ 359/675; 359/656; 359/819; 359/821; 359/822; 359/827

(58) Field of Classification Search .................. 359/656, 359/809, 675, 827, 821

See application file for complete search history.

(56) References Cited

U.S. PATENT DOCUMENTS

| | | | |
|---|---|---|---|
| 6,844,992 B2 * | 1/2005 | Schaefer et al. | 359/820 |
| 6,943,942 B2 * | 9/2005 | Horiguchi et al. | 359/381 |
| 7,471,471 B2 | 12/2008 | Omiya | |
| 7,715,128 B2 * | 5/2010 | Ishimoda et al. | 359/819 |

\* cited by examiner

*Primary Examiner* — Ricky Mack
*Assistant Examiner* — Zachary Wilkes
(74) *Attorney, Agent, or Firm* — McGinn IP Law Group, PLLC

(57) ABSTRACT

A lens unit is equipped with a lens, through which light from an object enters, and a lens barrel for holding the lens. An optical extending member is employed when observing a focal image of the lens with a microscope. A receiving portion having a receiving surface, for receiving a front end facet of the optical path extending member within the lens barrel that faces toward the lens, is formed at a portion of the lens barrel. A mounting portion positioned further rearward from a rear end facet of the optical path extending member, having a guide insertion aperture that extends in a direction perpendicular to the receiving surface and a mounting surface that extends in a direction parallel to the receiving surface is formed at the periphery of the guide insertion aperture is formed at a portion of the lens barrel.

16 Claims, 16 Drawing Sheets

LENS UNIT

BACKGROUND OF THE INVENTION

1. Field of the Invention

The present invention is related to a lens unit employed for cameras and the like. More specifically, the present invention is related to a lens unit equipped with a lens and a lens barrel for holding the lens, that adjusts the position of the lens utilizing an optical path extending member provided within the lens barrel.

2. Description of the Related Art

In a lens unit having groups of fixed lenses (lenses which are not moved in the direction of the optical axis during use) at the side closest to an object, such as the zoom lens of a camera, the refractive power of the lens groups becomes great as the total length of the lens unit becomes shorter. Therefore, axial shifting and inclinations among the lens groups are reflected in focusing states, which result in deteriorations in imaging quality.

Particularly in a bending optical system equipped with an optical member that bends the optical path 90 degrees within lens groups, such as that illustrated in U.S. Pat. No. 7,471,471, lenses having greater refractive powers are used to achieve the objective of such a construction, that is, miniaturization. Therefore, axial shifting and inclinations among the lens groups are even more likely to result in deterioration in imaging quality.

In order to avoid such problems, it is necessary for each lens that constitutes the lens groups to be mounted in a state that enables a predetermined level of optical performance to be obtained, without eccentricities or axial shifting. For this reason, it is necessary for positional adjustment procedures to be performed on lenses to achieve this state, in zoom lenses and the like.

When the positional adjustment of the lenses is performed, it is common for the positions of the aforementioned fixed lenses to be adjusted while they are held in a lens barrel. In the case that the fixed lenses have a positive refractive power, a focal image which is focused by the lenses is observed with a microscope, and the positions of the lenses are adjusted based on the observation results.

In the conventional method for adjusting the positions of lenses that utilizes a microscope, a problem is recognized that it is difficult to observe the focal image with the microscope. Hereinafter, this problem will be described in detail with reference to FIG. 3 and FIG. 4.

In FIG. 3 and FIG. 4, reference numeral 1 denotes a lens barrel, reference numerals 2 and 3 denote fixed lenses, through which light 4 from an object enters, and reference numeral 5 denotes a microscope which is used to observe a focal image. As explained previously, in the case that the fixed lenses have a positive refractive power, the focal position A thereof is at a position close to the lenses 2 and 3. In the case that the observation position B of the microscope 5, which abuts the rear end of the lens barrel 1 is at the position illustrated in FIG. 3, it is not possible to observe the focal image with the microscope 5. Under these circumstances, it becomes necessary to provide the microscope 5 such that the front end thereof is positioned forward of the rear end of the lens barrel as illustrated in FIG. 4, to enable observation of the focal image. However, it is generally not possible to adopt this configuration, because the microscope 5 and the lens barrel 1 interfere with each other. Forming the lens barrel 1 to be of a specialized construction that enables the microscope to be inserted into the lens barrel 1 may be considered. However, in this case, the cost of the lens barrel increases, and consequently results in the lens unit becoming expensive, which is a problem.

There is demand to facilitate observation using a microscope, when adjusting the positions of lenses to achieve a state that enables a predetermined level of optical performance to be obtained, by observing focal images focused by lenses held in a lens barrel with the microscope.

A method for adjusting the positions of lenses that utilizes an optical path extending member is being considered for this reason. This method for adjusting the positions of lenses is a method for adjusting the positions of lenses in a lens unit comprising a lens, through which light from an object enters, and a lens barrel for holding the lens, comprising the steps of:

observing a focal image of the lenses with a microscope; and adjusting the positions of the lenses based on the results of observation; characterized by:

an optical path extending member being provided within the lens barrel toward the rear of the lenses, to extend the focal position of the lenses toward the rear, that is, away from the object; and the observation of the focal image being performed in this state.

When executing a method for adjusting the positions of lenses such as that described above, it is necessary to accurately provide the optical path extending member at a predetermined relative position with respect to the lens barrel.

SUMMARY OF THE INVENTION

The present invention has been developed in view of the foregoing circumstances. It is an object of the present invention to provide a lens unit that enables an optical path extending member to be accurately provided at a predetermined relative position with respect to a lens barrel.

A first lens unit of the present invention comprises:

a lens, through which light from an object enters;

a lens barrel for holding the lens; and an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and is characterized by further comprising:

a receiving portion having a receiving surface, for receiving a front end facet of the optical path extending member within the lens barrel that faces toward the lens, formed at a portion of the lens barrel; and a mounting portion positioned further rearward from a rear end facet of the optical path extending member, having a guide insertion aperture that extends in a direction perpendicular to the receiving surface, and a mounting surface that extends in a direction parallel to the receiving surface at the periphery of the guide insertion aperture, formed at a portion of the lens barrel.

Note that examples of the above adjustment of the positions of the lenses include: positional adjustments to place the lenses in a state in which no axial shifting or inclinations are present in the lenses with respect to the central axis of the lens barrel; adjustments to correct axial shifting with respect to other lens groups; and adjustments to reduce distortion among other lenses in a complementary manner, to enable obtainment of a predetermined level of optical performance from the lenses as a whole.

A second lens unit of the present invention comprises:

a lens, through which light from an object enters;

a lens barrel for holding the lens; and an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and is characterized by further comprising:

a receiving portion having a receiving surface, for receiving a side surface that perpendicularly intersects a front end facet of the optical path extending member within the lens barrel that faces toward the lens, formed at a portion of the lens barrel; and a mounting portion positioned further rearward from a rear end facet of the optical path extending member, having a guide insertion aperture that extends in a direction perpendicular to the receiving surface, and a mounting surface that extends in a direction parallel to the receiving surface at the periphery of the guide insertion aperture, formed at a portion of the lens barrel.

Note that in the two types of lens units described above, it is desirable for an opening for receiving the optical path extending member from a direction that intersects with the central axis of the lens barrel to be formed in the lens barrel.

A third lens unit of the present invention comprises:

a lens, through which light from an object enters;

a lens barrel for holding the lens; and an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and is characterized by further comprising:

a receiving portion having a receiving surface, which is substantially perpendicular to the central axis of the lens barrel, formed at a portion of the lens barrel; and a mounting portion positioned further rearward from a rear end facet of the optical path extending member, having a guide insertion aperture that extends in a direction perpendicular to the receiving surface, and a mounting surface that extends in a direction parallel to the receiving surface at the periphery of the guide insertion aperture, formed at a portion of the lens barrel.

Note that in this type of lens unit, it is desirable for an opening for receiving the optical path extending member from a direction parallel to the central axis of the lens barrel to be formed in the lens barrel.

A fourth lens unit of the present invention comprises:

a lens, through which light from an object enters;

a lens barrel for holding the lens; and an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and is characterized by further comprising:

a plurality of protrusions, for positioning the optical path extending member by contacting the peripheral surface thereof, formed at a portion of the lens barrel.

A fifth lens unit of the present invention comprises:

a lens, through which light from an object enters;

a lens barrel for holding the lens; and an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and is characterized by further comprising:

a plurality of flange receiving grooves, for positioning the optical path extending member by receiving a plurality of flanges which are fixed on the optical path extending member, formed in portions of the lens barrel.

A sixth lens unit of the present invention comprises:

a lens, through which light from an object enters;

a lens barrel for holding the lens; and an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and is characterized by further comprising:

a flange receiving groove, for positioning the optical path extending member by receiving a single flange which is fixed on the optical path extending member, formed in a portion of the lens barrel; and a receiving portion, for positioning the optical path extending member by receiving the peripheral surface thereof, formed at a portion of the lens barrel.

A seventh lens unit of the present invention comprises:

a lens, through which light from an object enters;

a lens barrel for holding the lens; and an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and is characterized by further comprising:

a plurality of flange receiving grooves located at different locations, for positioning the optical path extending member by receiving a single flange which is fixed thereon, formed in portions of the lens barrel.

An eighth lens unit of the present invention comprises:

a lens, through which light from an object enters;

a lens barrel for holding the lens; and an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and is characterized by further comprising:

a receiving hole famed in a portion of the lens barrel, for positioning the optical path extending member, which is substantially formed as a rectangular column, by receiving the optical path extending member in a tightly fitting manner.

A ninth lens unit of the present invention comprises:

a lens, through which light from an object enters;

a lens barrel for holding the lens; and an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and is characterized by further comprising:

a first set of a plurality of protrusions, for positioning a first side surface of the optical path extending member by abutting the first side surface, formed at a portion of the lens barrel; and a second set of a plurality of protrusions, for positioning a second side surface of the optical path extending member that extends in a direction that intersects with the first side surface by abutting the second side surface, formed at a portion of the lens barrel.

Note that it is desirable for three protrusions to be formed in each of the first set of protrusions and the second set of protrusions.

A tenth lens unit of the present invention comprises:
a lens, through which light from an object enters;
a lens barrel for holding the lens; and
an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and is characterized by further comprising:

an opening for receiving the optical path extending member, which has a flange fixed thereon, from a direction that intersects with the central axis of the lens barrel being faulted in the lens barrel; and an abutting portion, for positioning the optical path extending member by abutting the flange, formed at the peripheral portion of the opening.

Note that it is desirable for an engaging portion to be fanned on the flange, and for at least one engaging portion for engaging the engaging portion of the flange to be formed at the peripheral portion of the opening in the lens barrel.

An eleventh lens unit of the present invention comprises:
a lens, through which light from an object enters;
a lens barrel for holding the lens; and
an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and is characterized by further comprising:

a positioning pin formed on a side surface of the optical path extending member; and a guide groove, for receiving the positioning pin and guiding the optical path extending member to a predetermined position, formed in a portion of the lens barrel.

The first lens unit of the present invention comprises the receiving portion having the receiving surface, for receiving the front end facet of the optical path extending member within the lens barrel that faces toward the lens, formed at a portion of the lens barrel; and the mounting portion positioned further rearward from the rear end facet of the optical path extending member, having the guide insertion aperture that extends in a direction perpendicular to the receiving surface and the mounting surface that extends in a direction parallel to the receiving surface at the periphery of the guide insertion aperture. Therefore, the lens barrel will be set at an orientation in which the central axis thereof is matched with the optical axis of the microscope, and the optical path extending member will be set at an orientation in which the optical axis thereof is parallel to the central axis of the lens barrel, if the orientation of a guide member to be inserted through the guide insertion aperture is accurately set in a predetermined direction in advance.

The second lens unit of the present invention comprises the receiving portion having a receiving surface, for receiving the side surface that perpendicularly intersects the front end facet of the optical path extending member within the lens barrel that faces toward the lens, formed at a portion of the lens barrel; and the mounting portion positioned further rearward from the rear end facet of the optical path extending member, having the guide insertion aperture that extends in a direction perpendicular to the receiving surface and the mounting surface that extends in a direction parallel to the receiving surface at the periphery of the guide insertion aperture. In this case as well, the lens barrel will be set at an orientation in which the central axis thereof is matched with the optical axis of the microscope, and the optical path extending member will be set at an orientation in which the optical axis thereof is parallel to the central axis of the lens barrel, if the orientation of a guide member to be inserted through the guide insertion aperture is accurately set in a predetermined direction in advance.

Note that the two types of lens units described above may adopt a configuration, wherein the opening for receiving the optical path extending member from a direction that intersects with the central axis of the lens barrel is formed in the lens barrel. In this case, the optical path extending member may be placed within the lens barrel through the opening. Thereafter, the relative positions between the optical path extending member and the lens barrel may be adjusted in a simple manner, by moving the two relative to each other in the direction of the optical axes thereof.

The third lens unit of the present invention comprises: the receiving portion having the receiving surface, which is substantially perpendicular to the central axis of the lens barrel, formed at a portion of the lens barrel; and the mounting portion positioned further rearward from the rear end facet of the optical path extending member, having the guide insertion aperture that extends in a direction perpendicular to the receiving surface, and the mounting surface that extends in a direction parallel to the receiving surface at the periphery of the guide insertion aperture. In this case as well, the lens barrel will be set at an orientation in which the central axis thereof is matched with the optical axis of the microscope, and the optical path extending member will be set at an orientation in which the optical axis thereof is parallel to the central axis of the lens barrel, if the orientation of a guide member to be inserted through the guide insertion aperture is accurately set in a predetermined direction in advance.

The fourth lens unit of the present invention comprises: the plurality of protrusions, for positioning the optical path extending member by contacting the peripheral surface thereof, formed at a portion of the lens barrel. Therefore, it becomes possible to set the optical path extending member at a certain orientation, for example, that in which the optical axis thereof is parallel to the central axis of the lens barrel, by causing the protrusions to contact the peripheral surface of the optical path extending member.

The fifth lens unit of the present invention comprises: the plurality of flange receiving grooves, for positioning the optical path extending member by receiving the plurality of flanges which are fixed on the optical path extending member, formed in portions of the lens barrel. Therefore, it becomes possible to set the optical path extending member at a certain orientation, for example, that in which the optical axis thereof is parallel to the central axis of the lens barrel, by having the flange receiving groove receive the flanges therein.

The sixth lens unit of the present invention comprises: the flange receiving groove, for positioning the optical path extending member by receiving the single flange which is fixed on the optical path extending member, formed in a portion of the lens barrel; and the receiving portion, for positioning the optical path extending member by receiving the peripheral surface thereof, formed at a portion of the lens barrel. Therefore, it becomes possible to set the optical path extending member at a certain orientation, for example, that in which the optical axis thereof is parallel to the central axis of the lens barrel, by having the flange receiving groove receive the flange therein, and by having the receiving portion receive the peripheral surface of the optical path extending member therein.

The seventh lens unit of the present invention comprises: the plurality of flange receiving grooves located at different locations, for positioning the optical path extending member by receiving the single flange which is fixed thereon, formed in portions of the lens barrel. Therefore, it becomes possible to set the optical path extending member at a certain orientation, for example, that in which the optical axis thereof is parallel to the central axis of the lens barrel, by having the flange receiving grooves receive the single flange therein.

The eighth lens unit of the present invention comprises: the receiving hole formed in a portion of the lens barrel, for positioning the optical path extending member, which is substantially formed as a rectangular column, by receiving the optical path extending member in a tightly fitting manner. Therefore, it becomes possible to set the optical path extending member at a certain orientation, for example, that in which the optical axis thereof is parallel to the central axis of the lens barrel, by having the receiving hole receive the optical path extending member therein.

The ninth lens unit of the present invention comprises: the first set of a plurality of protrusions, for positioning the first side surface of the optical path extending member by abutting the first side surface, formed at a portion of the lens barrel; and the second set of a plurality of protrusions, for positioning the second side surface of the optical path extending member that extends in a direction that intersects with the first side surface by abutting the second side surface, formed at a portion of the lens barrel. Therefore, it becomes possible to set the two surfaces of the optical path extending member at a certain orientation, for example, that in which the optical axis of the optical path extending member is parallel to the central axis of the lens barrel, by having the two sets of protrusions abut the side surfaces.

Note that a configuration may be adopted, wherein three protrusions are formed in each of the first set of protrusions and the second set of protrusions. In this case, the optical path extending member can be set in a certain orientation without wobbling.

The tenth lens unit of the present invention comprises: the opening for receiving the optical path extending member, which has the flange fixed thereon, from a direction that intersects with the central axis of the lens barrel being formed in the lens barrel; and the abutting portion, for positioning the optical path extending member by abutting the flange, formed at the peripheral portion of the opening. Therefore, it becomes possible to set the optical path extending member at a certain orientation, for example, that in which the optical axis thereof is parallel to the central axis of the lens barrel, by having the flange abut the abutting portion.

Note that a configuration may be adopted, wherein: an engaging portion is formed on the flange; and at least one engaging portion for engaging the engaging portion of the flange is formed at the peripheral portion of the opening in the lens barrel. In this case, the flange can be prevented from spinning while it is abutting the abutting portion (that is, the lens barrel). Accordingly, a more positive positioning effect can be obtained.

The eleventh lens unit of the present invention comprises: the positioning pin formed on the side surface of the optical path extending member; and the guide groove, for receiving the positioning pin and guiding the optical path extending member to the predetermined position, formed in a portion of the lens barrel. Therefore, it becomes possible to set the optical path extending member at a certain orientation, for example, that in which the optical axis thereof is parallel to the central axis of the lens barrel, by having the guide groove receive the positioning pin therein and moving the optical path extending member, which is linked to the pin, to the predetermined position.

DESCRIPTION OF THE PREFERRED EMBODIMENTS

Figure 3:
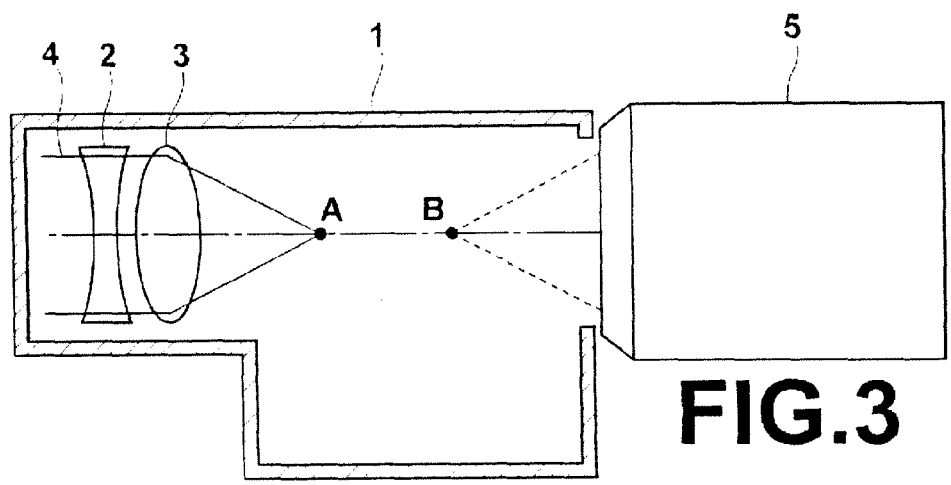
FIG. 3 is a diagram for explaining a problem associated with a conventional lens position adjusting method.
Figure 4:
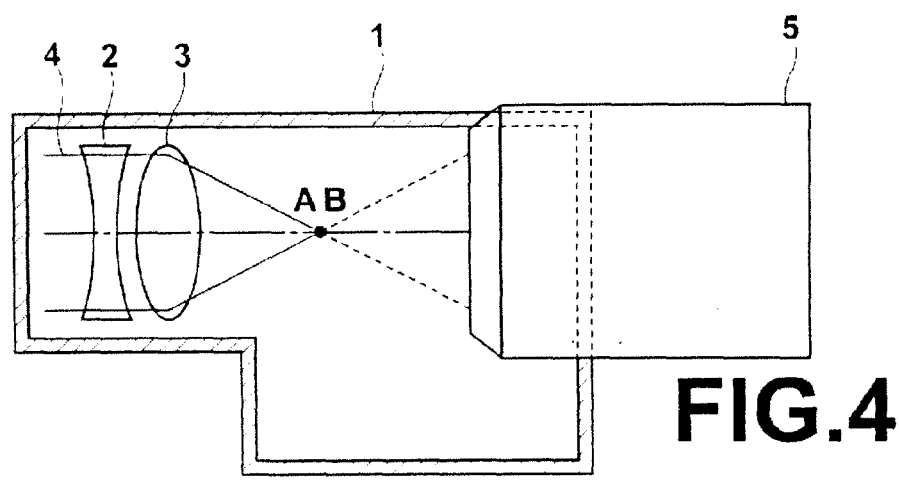
FIG. 4 is a diagram for explaining the problem associated with a conventional lens position adjusting method.

Hereinafter, embodiments of the present invention will be described with reference to the attached drawings. First, the basic outline of the lens position adjusting method which is administered onto the lens unit of the present invention will be described with reference to FIG. 1 and FIG. 2. Note that elements illustrated in FIG. 1 and FIG. 2 which are equivalent to those described previously with reference to FIG. 3 and FIG. 4 will be denoted with the same reference numerals, and descriptions thereof will be omitted insofar as they are not particularly necessary (this will apply throughout the present specification).

A lens unit 10 of the present example constitutes a zoom lens of a camera or the like. The lens unit 10 is equipped with: a fixed lens 11, through which light from an object enters from the left side of FIG. 1 and FIG. 2; and a cylindrical lens barrel 1 that holds the lens 11. Note that a movable lens group, which is a component of the zoom lens, is held within the lens barrel toward the rear of the fixed lens 11, that is, toward the side of the fixed lens 11 opposite the object. However, a description thereof will be omitted.

It is necessary for the fixed lens 11, which is a convex lens, to be held by the lens barrel 1 in a predetermined state, that is, a state in which the position of the fixed lens 11 is adjusted such that the optical axis thereof is not axially shifted or inclined with respect to the central axis O of the lens barrel 1. Particularly in the case that it is desired to shorten the entire length of the lens unit 10, a lens having a high refractive power is employed as the fixed lens 11. In this case, axial shifting and inclinations are reflected in focusing states, which result in deteriorations in imaging quality.

Note that examples of the above adjustment of the positions of the lenses include: adjustment to correct axial shifting with respect to other lens groups; and adjustment to reduce distortion among other lenses in a complementary manner, to enable obtainment of a predetermined level of optical performance from the lenses as a whole, in addition to the positional adjustment to place the lenses in a state in which no axial shifting or inclinations are present in the lenses with respect to the central axis of the lens barrel described above.

The method of the present example is applied to positional adjustment of the fixed lens 11. First, a focal image of the fixed lens 11 is observed by the microscope 5. That is, when the focal image is enlarged by the microscope and observed, the image becomes distorted in a so called top shape in the case that the axial shifting or inclination is present. The position of the fixed lens within the lens barrel 11 is adjusted such that the distortion is resolved. Note that the specifics of the process for adjusting the position of the fixed lens 11 are described in U.S. Pat. No. 7,471,471. However, the process is not directly related to the present invention, and therefore, a detailed description thereof will be omitted.

Figure 1:
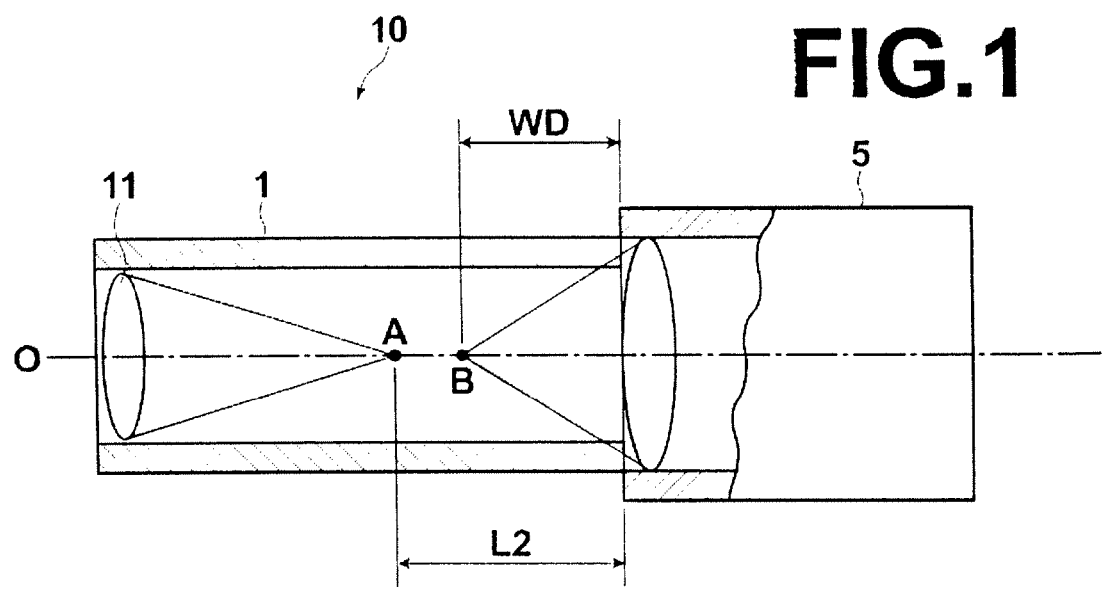
FIG. 1 is a partially sectional side view that illustrates a lens unit that utilizes an optical path extending member to adjust the position of a lens, in a state prior to the position of the lens being adjusted.

In the lens unit of the present example, the focal position of the fixed lens 11 is fundamentally at the position denoted by A in FIG. 1. In contrast, the observation position of the microscope 5 is at the position denoted by B in FIG. 1, which is remote from the focal position A. Note that as illustrated in FIG. 1, the distance from the rear end facet of the lens barrel 1 to the focal position A is designated as L2, and the distance from the front end facet of the microscope 5 to the observation position B is designated as WD.

Figure 2:
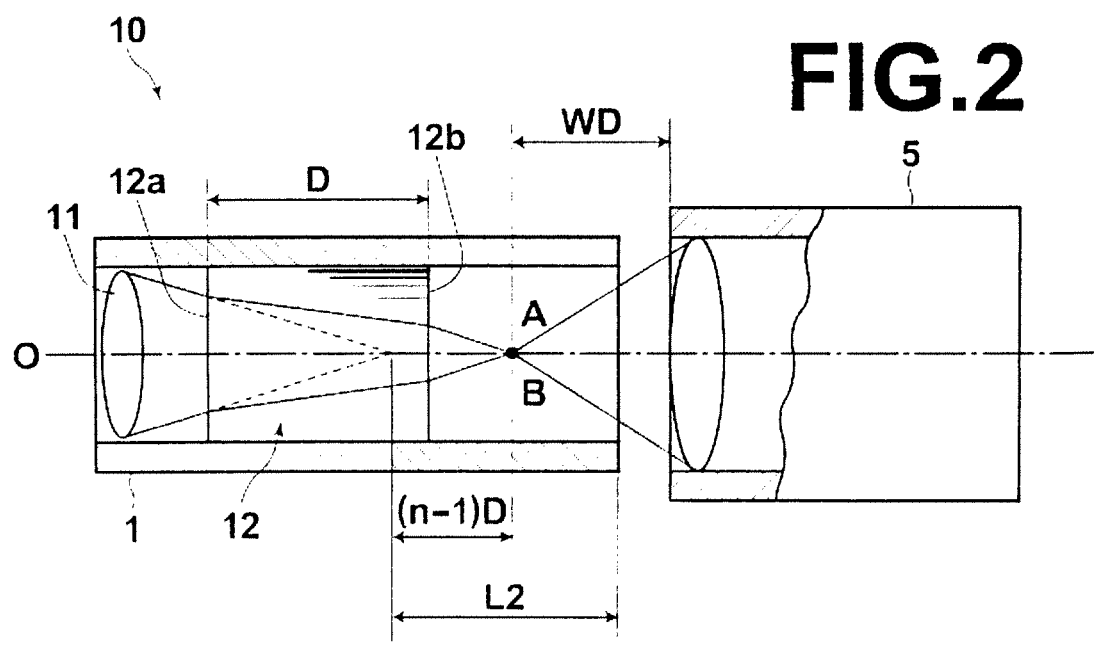
FIG. 2 is a partially sectional side view that illustrates the lens unit of FIG. 1 in a state during adjustment of the position of the lens.

In this state, it is not possible to observe the focal image with the microscope 5. Therefore, an optical path extending member 12 is provided within the lens barrel 1 toward the rear of the fixed lens 11, as illustrated in FIG. 2. The optical path extending member 12 is formed by optical glass or the like having a uniform refractive index n (1<n), and is shaped as a circular column, of which a front end facet 12a closer to the fixed lens 11 and a rear end facet 12b remote from the fixed lens 11 are parallel. Note that the optical path extending member 12 is inserted into the lens barrel 1 from the rear end, that is, the end toward the right in FIG. 2, of the lens barrel 1.

When the optical path extending member 12 is provided, the focal position A of the fixed lens extends rearward for a distance of (n−1)D, wherein D is the length of the optical path extending member 12. Thereby, it becomes possible to match the observation position B of the microscope 5 with the focal position A of the fixed lens 11, and observation of the focal image of the fixed lens 11 by the microscope is facilitated. In greater detail, the conditions which are required in order for the microscope 5 to not interfere with the lens barrel 1 are: L2−(n−1)D<WD, that is, L2−WD<(n−1)D.

The position adjustment process of the fixed lens 11 is performed while observing the focal point thereof with the microscope 5. When the position adjustment process is completed, the optical path extending member is removed from the lens barrel 1.

Next, a lens unit 201 according to a first embodiment of the present invention will be described with reference to FIG. 5. The lens unit 201 also constitutes a zoom lens of a camera or the like. The lens unit 201 is equipped with: a fixed convex lens 22, through which light from an object enters; a prism 23; a concave fixed lens 24; and a rectangular lens barrel 21 that holds these optical elements. The prism 23 bends the optical path 90 degrees between the two lenses 22 and 24. By the provision of the prism 23, the lens unit 201 is a bending optical system.

The lens unit 201 is arranged such that the fixed lens 24 faces a subject during use of the camera in which it is provided. Light from the subject enters the fixed lens 22 from the left of FIG. 5, via the fixed lens 24 and the prism 23. Note that a movable lens group, which is a component of the zoom lens, is held within the lens barrel 21 toward the rear of the fixed lens 22, that is, toward the side of the fixed lens 22 opposite the subject. However, a description thereof will be omitted.

In the present embodiment as well, it is necessary for the fixed lens 22 to be held by the lens barrel 21 in a predetermined state, that is, a state in which the position of the fixed lens 22 is adjusted such that the optical axis thereof is not axially shifted or inclined with respect to the central axis O of the lens barrel 21. Particularly in the case that it is desired to shorten the entire length of the lens unit 201, a lens having a high refractive power is employed as the fixed lens 22. In this case, axial shifting and inclinations are reflected in focusing states, which result in deteriorations in imaging quality. In addition, the bending optical system is employed in the present embodiment, to miniaturize the camera. In this case, a lens having an even greater refractive power is generally employed as the fixed lens 22 in order to miniaturize the camera. The use of such a lens increases the likelihood that the foregoing problems will occur.

In the present embodiment as well, a focal image of the fixed lens 22 is observed by a microscope (not shown), in order to adjust the position of the fixed lens 22. In this case as well, an optical path extending member 25 is provided within the lens barrel 21 toward the rear of the fixed lens 22 to observe the focal image in a state in which the focal position of the fixed lens 22 is displaced toward the rear. Therefore, similar effects as those described with reference to FIG. 1 and FIG. 2 are obtained. Note that the positional adjustment of the fixed lens 22 which is performed while observing the focal image is also the same as that described previously, and a redundant description thereof will be omitted (the same applies to the following embodiments).

Figure 5:
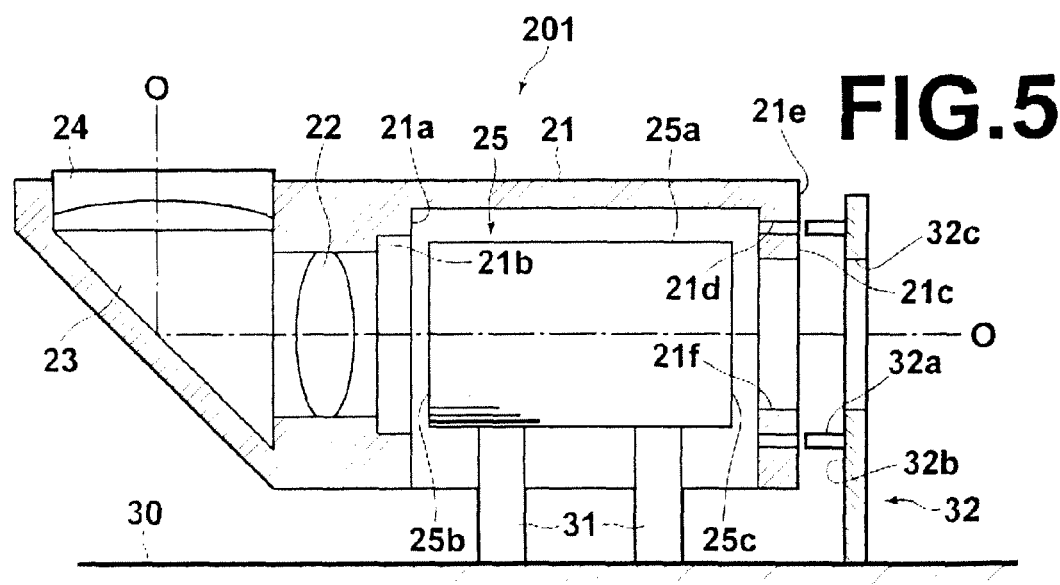
FIG. 5 is a partially sectional side view that illustrates a lens unit according to a first embodiment of the present invention.

Here, FIG. 5 illustrates a state prior to the optical path extending member 25 being positioned and fixed with respect to the lens barrel 21. Hereinafter, the positioning and fixing of the optical path extending member 25 which is performed from the illustrated state will be described. The optical path extending member 25 is formed as a cylinder as an example, in which a front end facet 25b that faces the side of the fixed lens 22 and a rear end facet 25c at the opposite end are accurately perpendicular with respect to the peripheral surface 25a thereof.

Meanwhile, a receiving portion 21a having a receiving surface 21b for receiving the front end facet 25b is formed at a position within the lens barrel 21 close to the front end facet 25b of the optical path extending member 25. in addition, a mounting portion 21c is formed at a position toward the rear of the rear end facet 25c of the optical path extending member 25. The mounting portion 21c includes: two guide insertion apertures 21d that extend perpendicular with respect to the receiving surface 21b, and a mounting surface 21e that extends parallel to the receiving surface 21b about the periphery of the guide insertion apertures 21d.

Two holding members 31, for supporting the peripheral surface 25a of the optical path extending member 25 from below, and a mounting member 32, onto which the lens barrel 21 is mounted, are erected on a measurement stage 30. The mounting member 32 includes two guide pins 32a, and a flat holding surface 32b which is perpendicular to the guide pins 32a, as an example. The microscope (not shown) is provided at a position toward the right of the lens barrel 21 in FIG. 5, and is utilized to observe a focal image as described previously. The guide pins 32a are provided such that they extend in directions parallel to the optical axis of the microscope.

Note that an aperture 32c is formed through the mounting member 32, and an aperture 21f is formed through the mounting portion 21c of the lens barrel 21. Therefore, light which is output from the optical path extending member 25 can enter the microscope by being transmitted through these apertures 21f and 32c.

When the optical path extending member 25 is positioned and fixed with respect to the lens barrel 21, the optical path extending member 25 25 is placed on and held by the two holding members 31. A portion of the side wall (the bottom wall in FIG. 5) of the lens barrel 21 is open, and the lens barrel 21 is lowered from above so as to fit the optical path extending member 25 within the lens barrel 21 through this opening. When the optical path extending member 25 is within the interior space of the lens barrel 21, the lens barrel 21 is moved in the direction toward the mounting member 32 (toward the right in FIG. 5). The two guide pins 32a enter the guide insersion apertures 21d of the mounting portion 21c, and the lens barrel 21 is continued to be moved toward the right until the mounting surface 21e contacts the holding surface 32a of the mounting member 32. After the lens barrel 21 is moved in this manner, the front end facet 25b of the optical path extending member 25 ultimately contacts the receiving surface 21b of the lens barrel 21.

In this state, the central axis O of the lens barrel 21 matches the optical axis of the microscope, and the optical axis of the optical path extending member 25 matches the central axis O. In this manner, the lens unit 201 of the fifth embodiment enables the optical path extending member 25 to be positioned and fixed such that the optical axis thereof matches the central axis O of the lens barrel 21, by a simple procedure.

Figure 6:
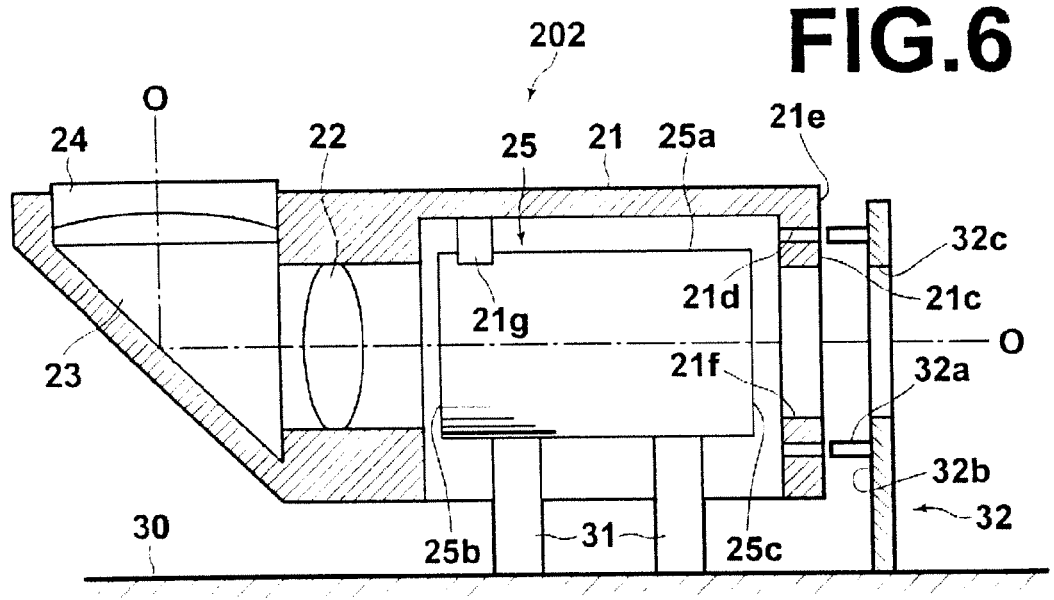
FIG. 6 is a partially sectional side view that illustrates a lens unit according to a second embodiment of the present invention.

Next, a lens unit 202 according to a second embodiment of the present invention will be described with reference to FIG. 6. The lens unit 202 differs from the lens unit 201 of FIG. 5 in that a receiving portion 21g, which is different from the receiving portion 21a, is provided. The receiving portion 21g receives the side surface (the peripheral surface 25a) of the optical path extending member 25, which is perpendicular to the front end facet 25b, and the receiving surface thereof is a curved surface that extends parallel to the central axis O of the lens barrel 21.

In the second embodiment as well, the positioning and fixing of the optical path extending member 25 is performed in the same manner as in the first embodiment. However, in the second embodiment, the position of the optical path extending member 25 is defined by the receiving portion 21g, which is of the shape described above. Therefore, a state can be achieved in which the central axis O of the lens barrel 21 is matched with the optical axis of the microscope, and the optical axis of the optical path extending member 25 is matched with the central axis O.

Figure 7:
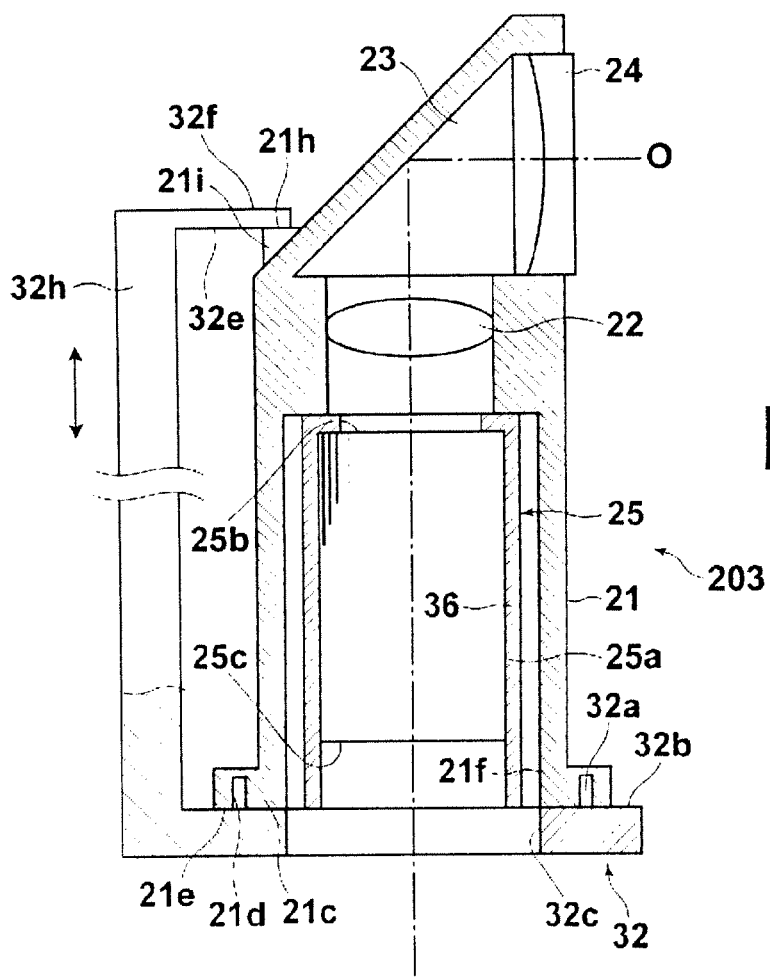
FIG. 7 is a partially sectional side view that illustrates a lens unit according to a third embodiment of the present invention.

Next, a lens unit 203 according to a third embodiment of the present invention will be described with reference to FIG. 7. The lens unit 203 differs from the lens unit 201 of FIG. 5 in that a receiving portion 21i, which is different from the receiving portion 21a, is provided. The receiving portion 21i is faulted outside the lens barrel 21, and has a receiving surface 21h which is perpendicular to the central axis O of the lens barrel 21.

In addition, a holding portion 36 that holds the optical path extending member 25 in a state that the optical axis thereof is parallel with the guide pins 32a is provided on the mounting member 32. Further, the mounting member 32 is provided with an arm 32h, which is extendable and contractable in the vertical direction at a position toward the left of FIG. 7. A holding portion 32f having an abutting surface 32a is formed at the upper end of the atm 32h. The abutting surface 32a extends perpendicular to the guide pins 32a.

When the optical path extending member 25 is positioned and fixed with respect to the lens barrel 21, first, the guide pins 32a are inserted into the guide insertion apertures 21d of the mounting portion 21c, to fix the lens barrel 21 to the mounting member 32. Next, the atm 32h is lowered from a position higher than that illustrated in FIG. 7, such that the holding portion 32f the receiving surface 21h of the receiving portion 21i abuts the abutting surface 32e of the holding portion 32f, as illustrated in FIG. 7.

When the state described above is achieved, the optical path extending member 25 is inserted into the holding portion 36 from below through the aperture 32c of the mounting member 32, and is held by the holding portion 36. Alternatively, the optical path extending member 25 may be held within the holding portion 36, and then the abutting surface 32e of the holding portion 32f may be caused to abut the receiving surface 21f of the holding portion 21i. In either case, the central axis O of the lens barrel 21 and the optical axis of the optical path extending member 25 are matched in this state.

Figure 8:
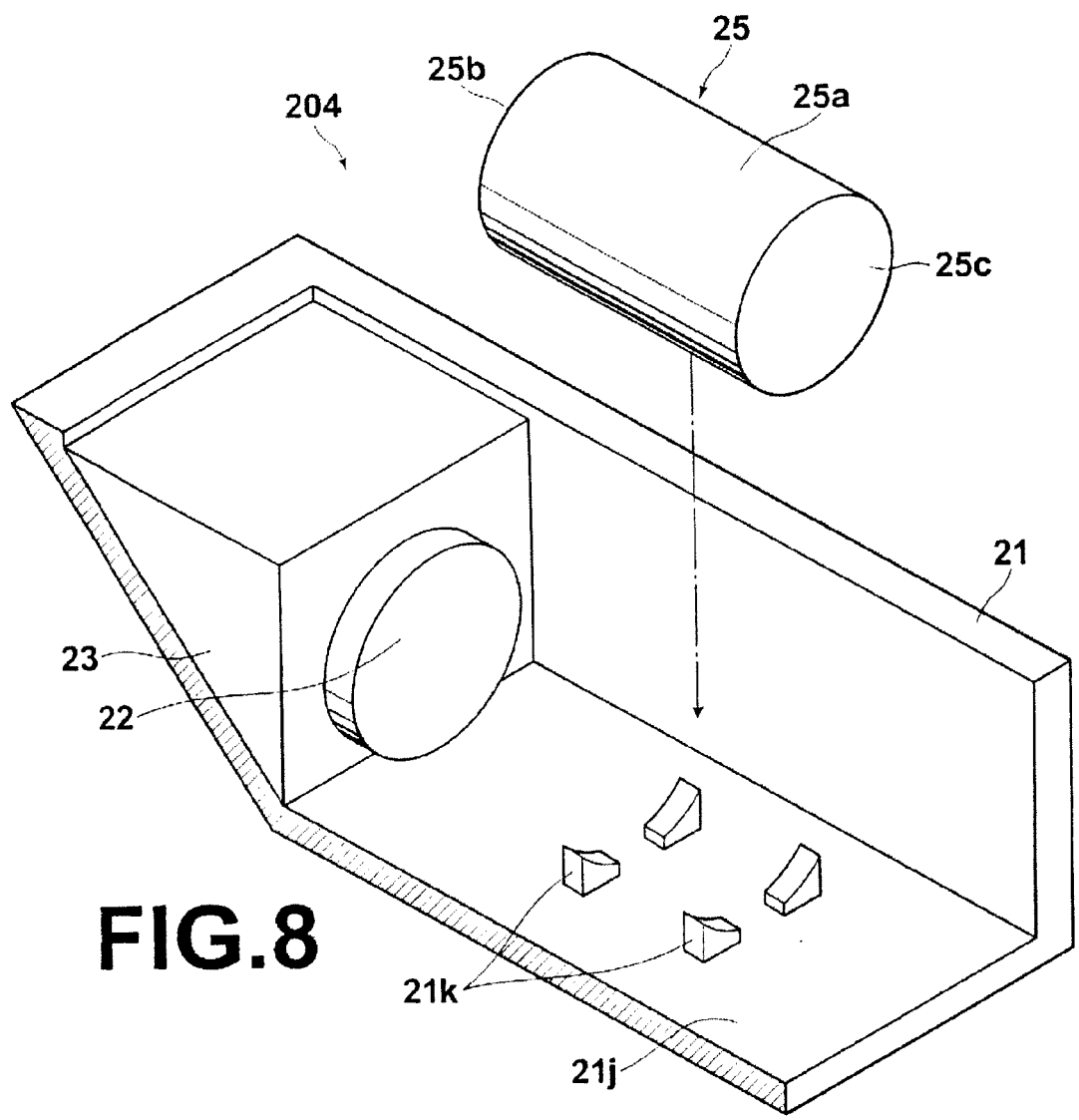
FIG. 8 is a partially sectional perspective view that illustrates a lens unit according to a fourth embodiment of the present invention.

Next, a lens unit 204 according to a fourth embodiment of the present invention will be described with reference to FIG. 8. Note that the side wall towards the viewer and the upper wall of the lens barrel 21 are omitted. The lens unit 201 is provided with four positioning protrusions 21k on a wall 21j of the lens barrel 21, as an example. The upper surfaces of the positioning protrusions 21k are formed as curved surfaces for receiving the peripheral surface 25a of the optical path extending member 25 in a tightly fitting manner. By forming the plurality of positioning protrusions 21k to these predetermined shapes, it becomes possible to position the optical path extending member 25 in a state in which the optical axis thereof is matched with the central axis of the lens barrel 21.

Figure 9:
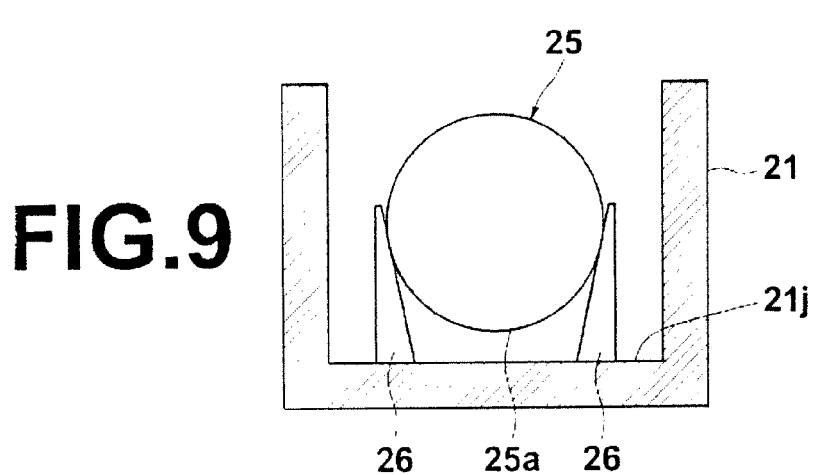
FIG. 9 is a partially sectional front view that illustrates a lens unit according to a fifth embodiment of the present invention.

Note that in the fourth embodiment, the positioning protrusions 21k having curved surfaces as the surfaces for receiving the optical path extending member 25 were employed. Alternatively, positioning protrusions 26 having flat surfaces as the surfaces for receiving the optical path extending member 25 may be employed, as in the lens unit of the fifth embodiment illustrated in FIG. 9.

Figure 10:
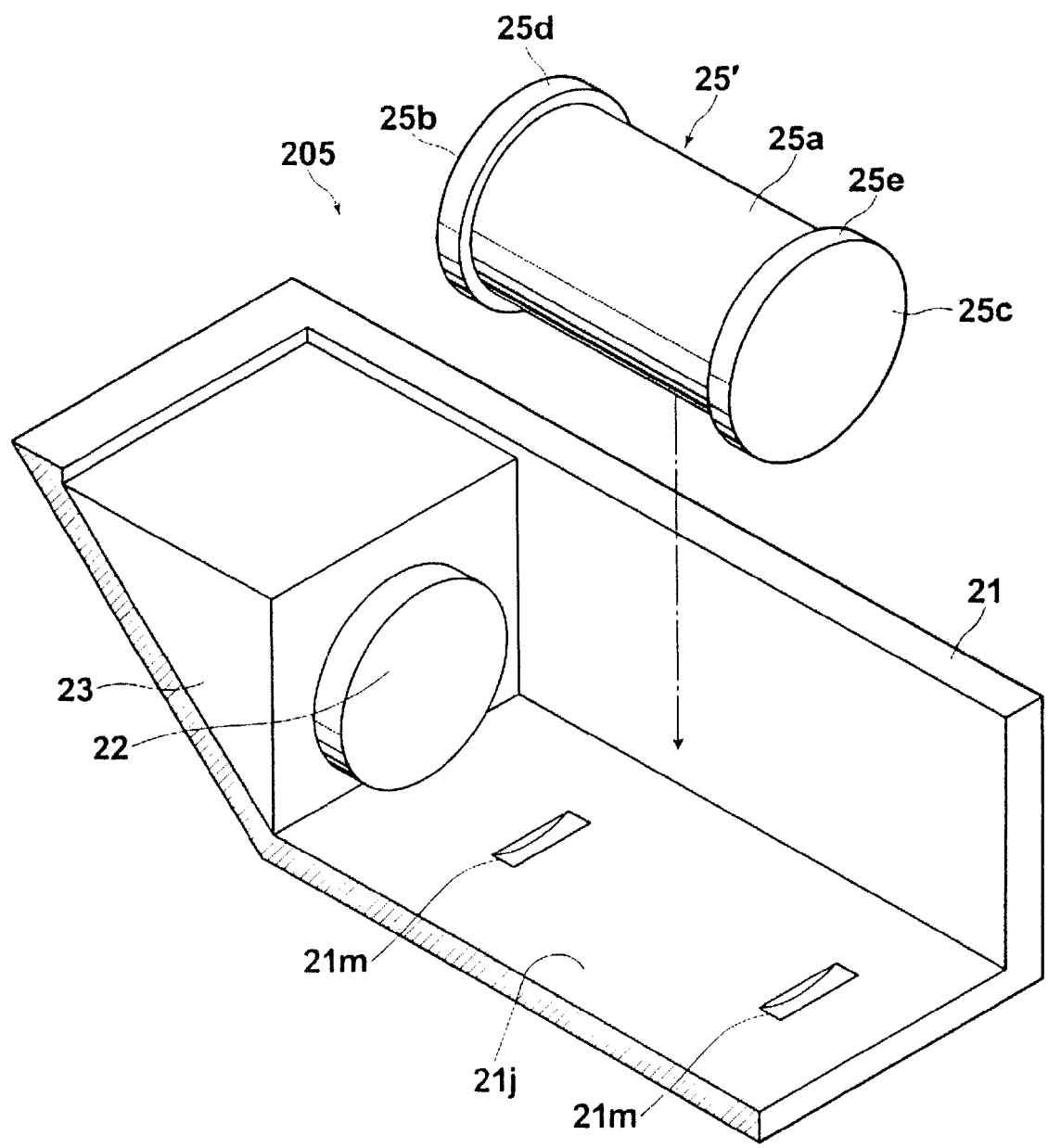
FIG. 10 is a partially sectional perspective view that illustrates a lens unit according to a sixth embodiment of the present invention.

Next, a lens unit 205 according to a sixth embodiment of the present invention will be described with reference to FIG. 10. The lens unit 205 has two flange receiving grooves 21m formed within the wall 21j of the lens barrel 21, as an example. As illustrated in FIG. 10, an optical path extending member 25' to be employed here has flanges 25d and 25e at the ends thereof. The optical path extending member 25' is mounted within the lens barrel 21 in a state in which the flanges 25d and 25e are within the flange receiving grooves 21m in a tightly fitting manner. In this case as well, it becomes possible to position the optical path extending member 25' in a state in which the optical axis thereof is matched with the central axis of the lens barrel 21.

Next, a lens unit 206 according to a seventh embodiment of the present invention will be described with reference to FIG. 11. The lens unit 206 has one flange receiving groove 21m and a receiving portion 21n formed in and on the wall 21j of the lens barrel 21. The receiving portion 21n has an arcuate receiving surface 21p for receiving the peripheral surface 25a of an optical path extending member 25" in a tightly fitting manner.

Figure 11:
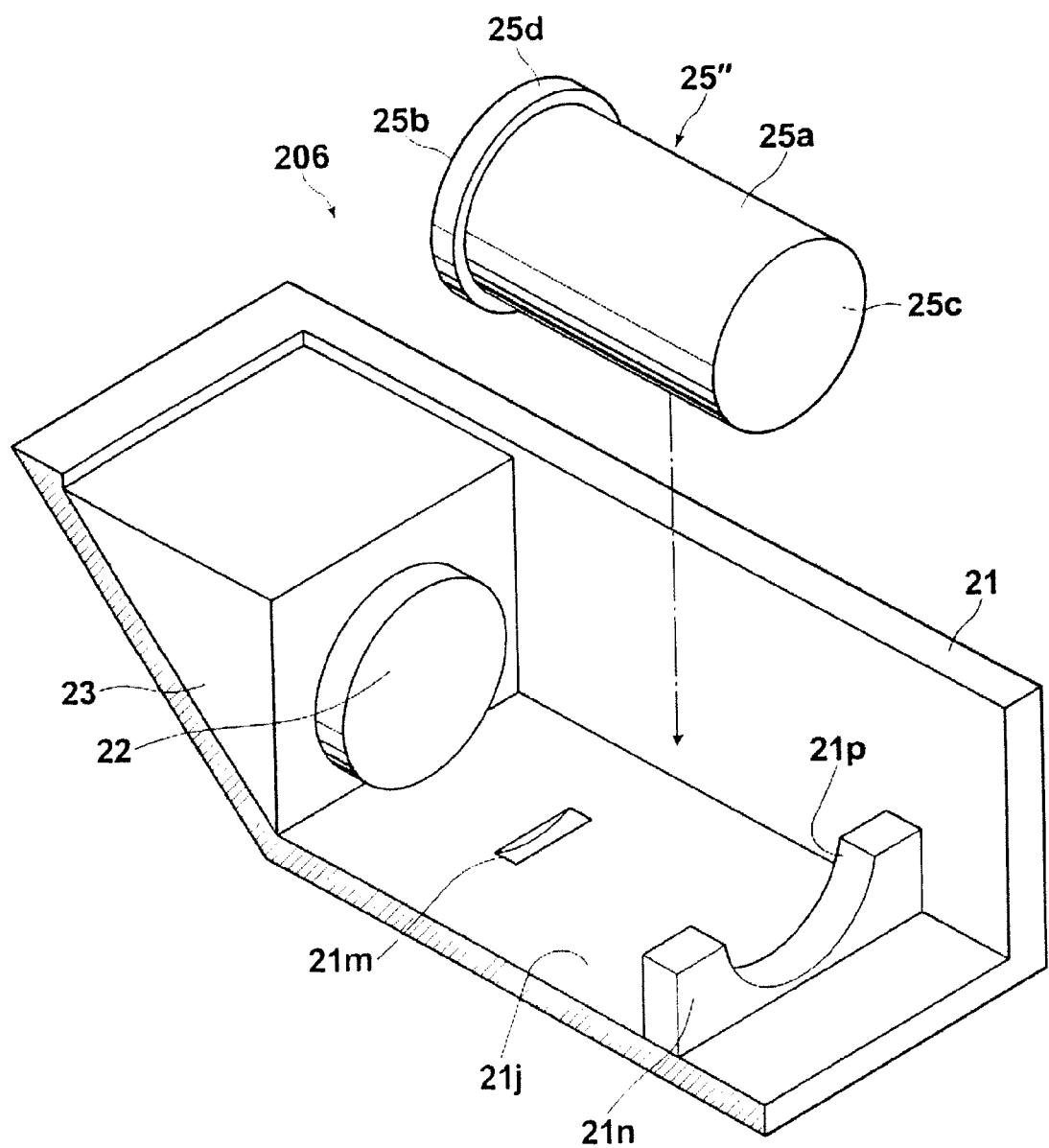
FIG. 11 is a partially sectional perspective view that illustrates a lens unit according to a seventh embodiment of the present invention.

As illustrated in FIG. 11, the optical path extending member 25" to be employed here has a flange 25d at one end thereof. The optical path extending member 25" is mounted within the lens barrel 21 in a state in which the flange 25d is within the flange receiving groove 21m in a tightly fitting manner, and the peripheral surface 25a is received on the receiving surface 21p. In this case as well, it becomes possible to position the optical path extending member 25" in a state in which the optical axis thereof is matched with the central axis of the lens barrel 21.

Next, a lens unit 207 according to an eighth embodiment of the present invention will be described with reference to FIG. 12 and FIG. 13. In the lens unit 207, a flange receiving groove 21r is formed in each of two walls 21v of the lens barrel 21 that face each other.

Figure 12:
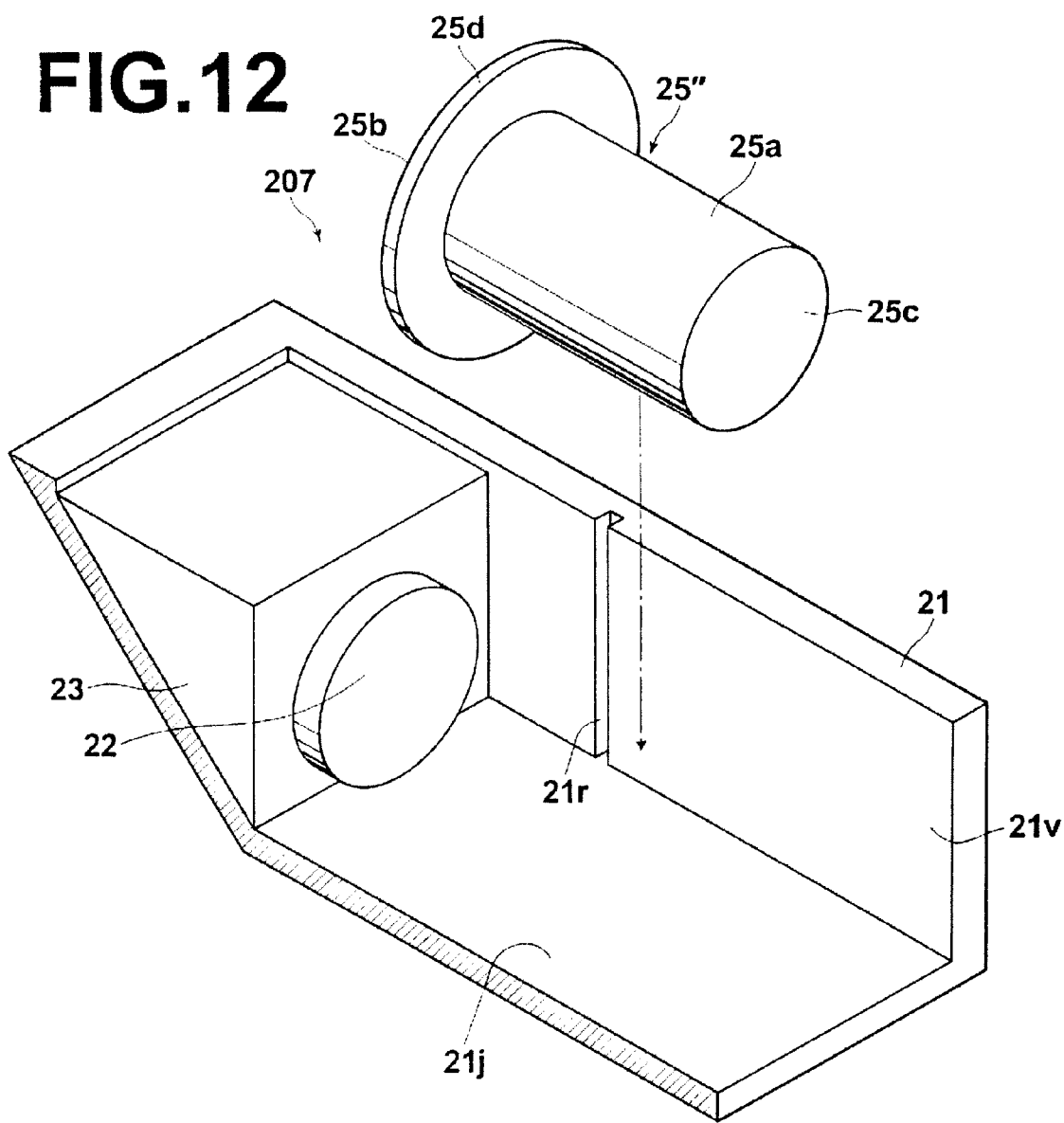
FIG. 12 is a partially sectional perspective view that illustrates a lens unit according to an eighth embodiment of the present invention.
Figure 13:
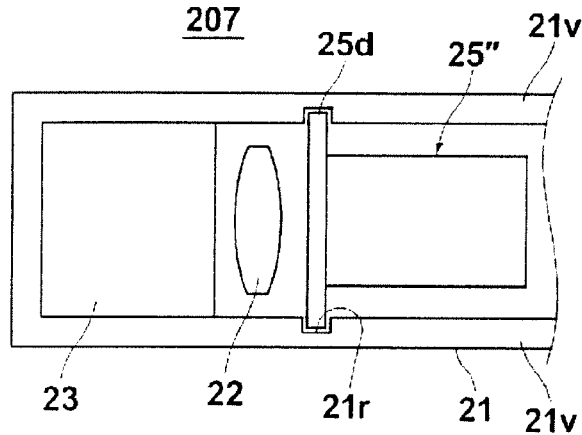
FIG. 13 is a partial plan view that illustrates a portion of the lens unit of FIG. 12.

As illustrated in FIG. 12 and FIG. 13, the optical path extending member 25" to be employed here has a flange 25d at one end thereof. The optical path extending member 25" is mounted within the lens barrel 21 in a state in which the flange 25d is within the pair of flange receiving grooves 21r in a tightly fitting manner. In this case as well, it becomes possible to position the optical path extending member 25" in a state in which the optical axis thereof is matched with the central axis of the lens barrel 21. Note that a flange receiving groove 21r may be formed in each of three walls of the lens barrel 21.

Next, a lens unit 208 according to a ninth embodiment of the present invention will be described with reference to FIG. 14. In the lens unit 208, a rectangular receiving hole 21s is formed in the wall 21j of the lens barrel 21.

Figure 14:
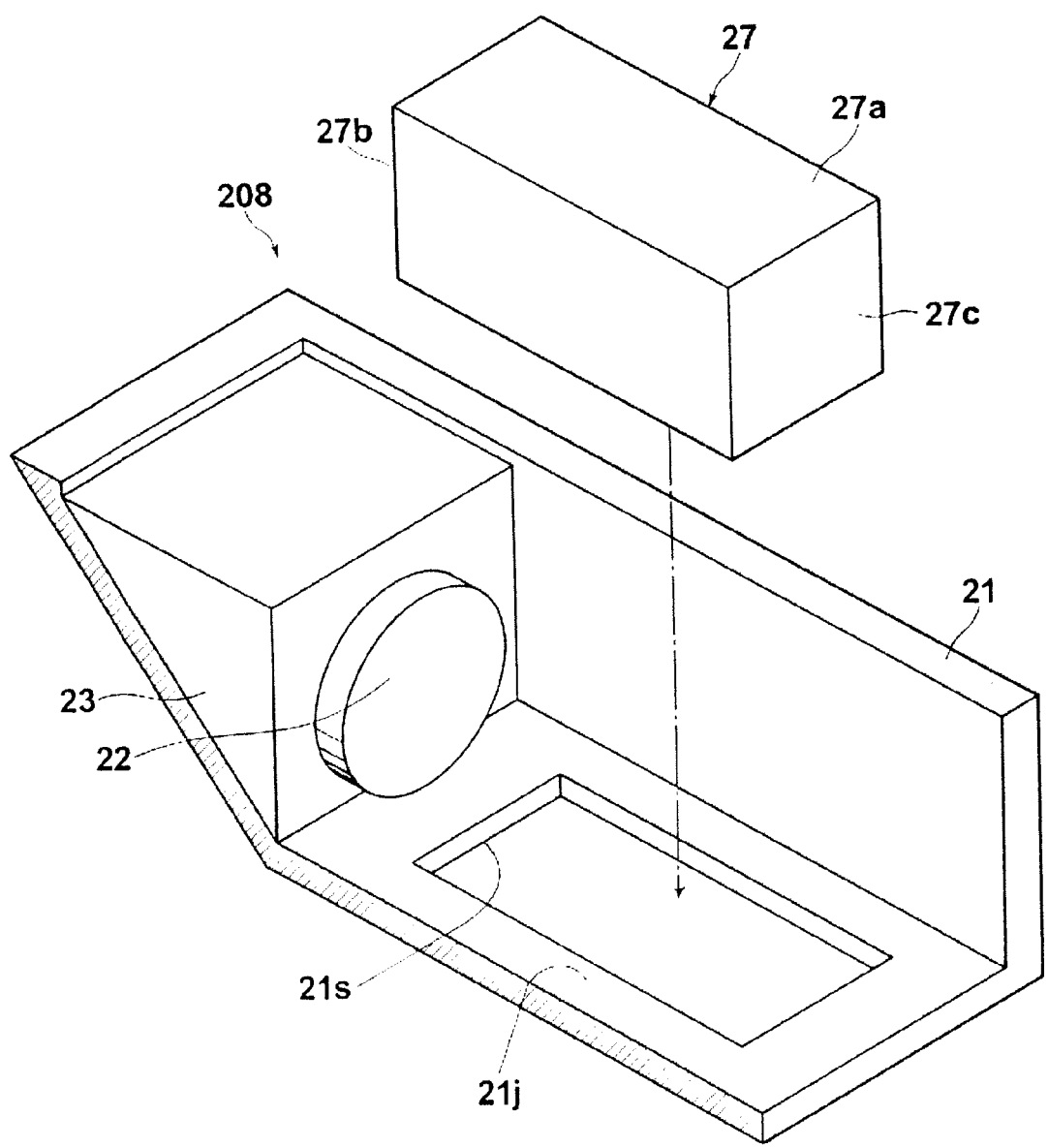
FIG. 14 is a partially sectional perspective view that illustrates a lens unit according to a ninth embodiment of the present invention.

As illustrated in FIG. 14, an optical path extending member 27 to be employed here is a parallelepiped having four side surfaces 27a, a front end facet 27b, and a rear end facet 27c. The optical path extending member 27 is mounted within the lens barrel 21 in a state that a portion thereof is tightly fitted within the receiving hole 21s. In this case as well, it becomes possible to position the optical path extending member 27 in a state in which the optical axis thereof is matched with the central axis of the lens barrel 21.

Next, a lens unit 209 according to a tenth embodiment of the present invention will be described with reference to FIG. 15.

In the lens unit 209, three positioning protrusions 21t are formed on each of the wall 21j and the wall 21v, which is perpendicular to the wall 21j, or the lens barrel 21.

The optical path extending member 27, which is employed here, is the same as that illustrated in FIG. 14, and is a parallelepiped having the four side surfaces 27a, the front end facet 27b, and the rear end facet 27c. The optical path extending member 27 is mounted within the lens barrel in a state in which one of the side walls 27a is in stable contact with the positioning protrusions 21t on the wall 21j, and another one of the side walls 27a is in stable contact with the positioning protrusions 21t on the wall 21v. By forming the plurality of positioning protrusions 21t into predetermined shapes, it becomes possible to position the optical path extending member 27 in a state in which the optical axis thereof is matched with the central axis of the lens barrel 21.

Note that one or a plurality of aperture 21w may be provided in the wall 21v that faces the wall 21v on which the positioning protrusions 21t are formed. A member may pass through the one or more apertures 21w to press the optical path extending member 27, such that the optical path extending member 27 is in close contact with the positioning protrusions 21t formed on the wall 21v.

Next, a lens unit 210 according to an eleventh embodiment of the present invention will be described with reference to FIG. 16. Note that the lens 22 is omitted from FIG. 16 (the same applies to FIGS. 17 through 20). In the lens unit 210, an opening 21y is formed in a wall 21x, and a rail shaped abutting portion 37a and an abutting protrusion 37c are formed on the wall 21x about the periphery of the opening 21y.

Figure 15:
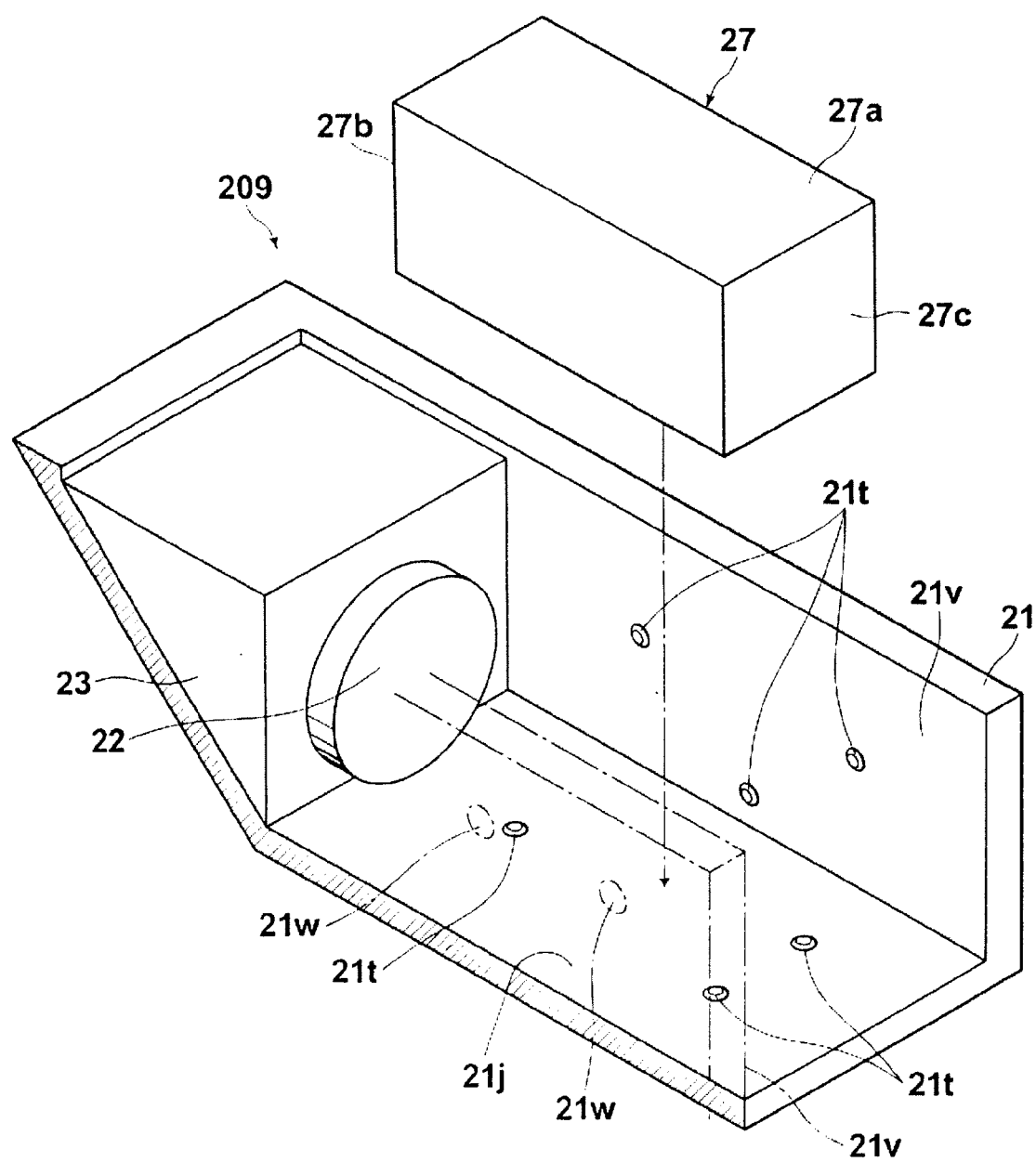
FIG. 15 is a partially sectional perspective view that illustrates a lens unit according to a tenth embodiment of the present invention.

The optical path extending member 27 to be employed here is a parallelepiped which is basically the same as that illustrated in FIG. 15, except that a flange 28 is fixed thereon. The optical path extending member 27 is placed within the lens barrel 21 through the opening 21y, with the side thereof having the flange 28 fixed thereon up. At this time, the optical path extending member 27 is positioned by the flange 28 abutting the abutting portion 37a and the abutting protrusion 37c. In this case as well, it becomes possible to position the optical path extending member 27 in a state in which the optical axis thereof is matched with the central axis of the lens barrel 21.

Figure 17:
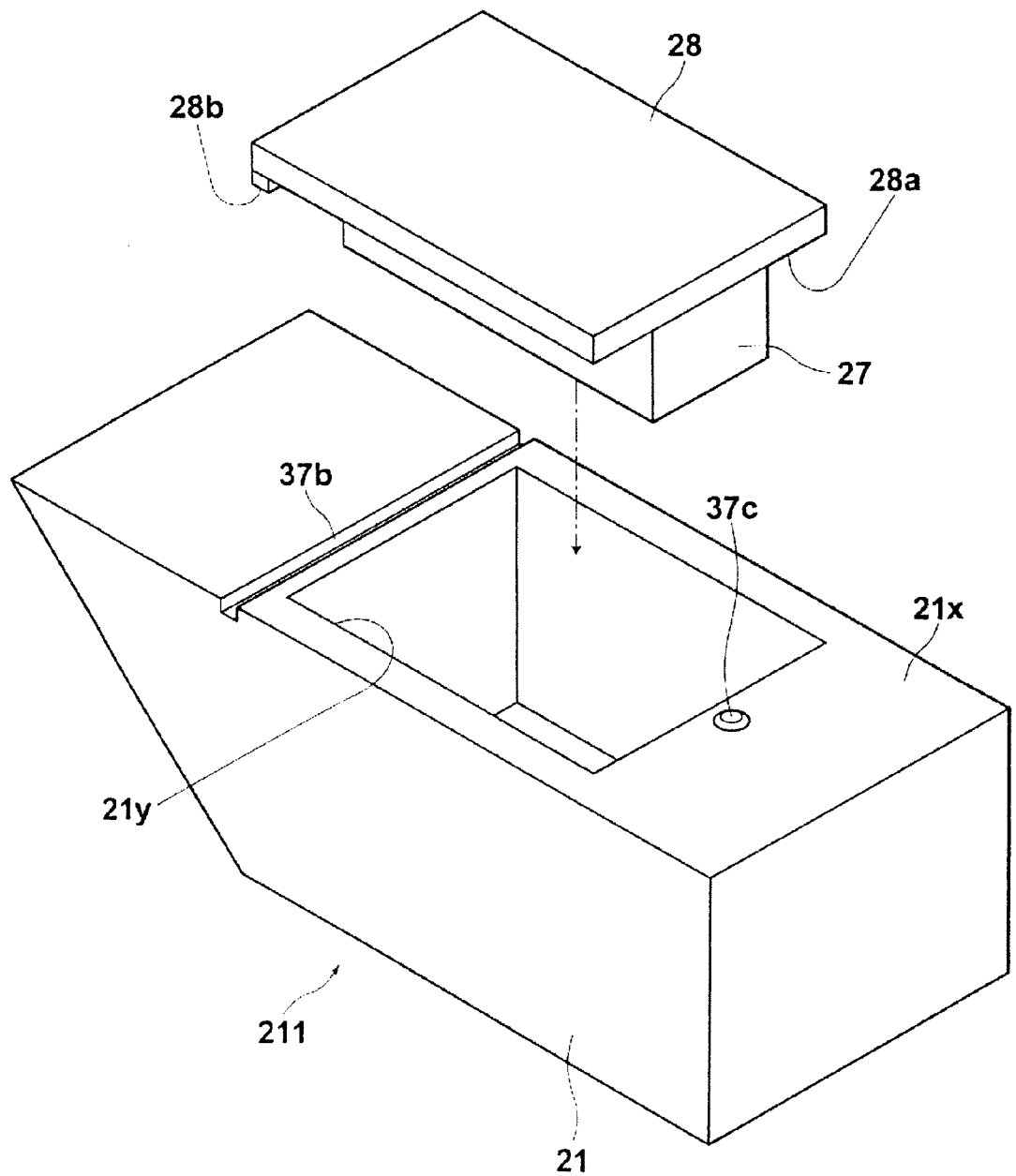
FIG. 17 is a partially sectional perspective view that illustrates a lens unit according to a twelfth embodiment of the present invention.

Next, a lens unit 211 according to a twelfth embodiment of the present invention will be described with reference to FIG. 17. In the lens unit 211, the opening 21y is faulted in a wall 21x, and an abutting portion 37b in the form of an elongate groove and the abutting protrusion 37c are formed on the wall 21x about the periphery of the opening 21y.

Figure 16:
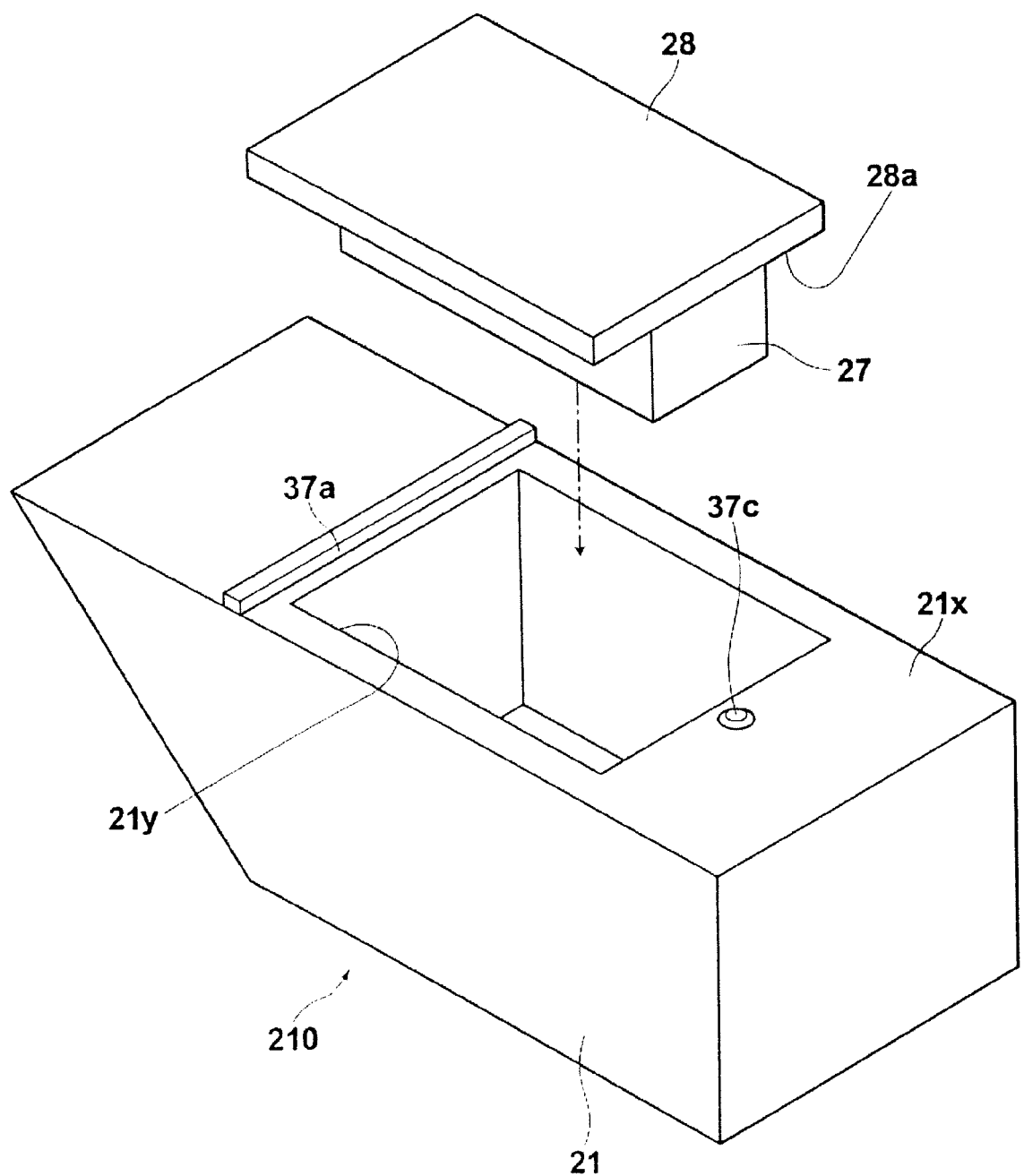
FIG. 16 is a partially sectional perspective view that illustrates a lens unit according to an eleventh embodiment of the present invention.

The optical path extending member 27 to be employed here is basically the same as that illustrated in FIG. 16, except that an abutting portion 28b in the form of a rail is provided at a portion of the underside 28a of the flange 28. The optical path extending member 27 is placed within the lens barrel 21 through the opening 21y, with the side thereof having the flange 28 fixed thereon up. At this time, the optical path extending member 27 is positioned by the flange 28 abutting the abutting protrusion 37c, and by the rail shaped abutting portion 28b being fitted into the abutting portion 37b. In this case as well, it becomes possible to position the optical path extending member 27 in a state in which the optical axis thereof is matched with the central axis of the lens barrel 21. In addition, in this case, the abutting portion 28b in the form of a rail is fitted within the abutting portion 37b in the form of an elongate groove. Therefore, movement of the optical path extending member 27 in the direction of the optical axis thereof can also be prevented.

Figure 18:
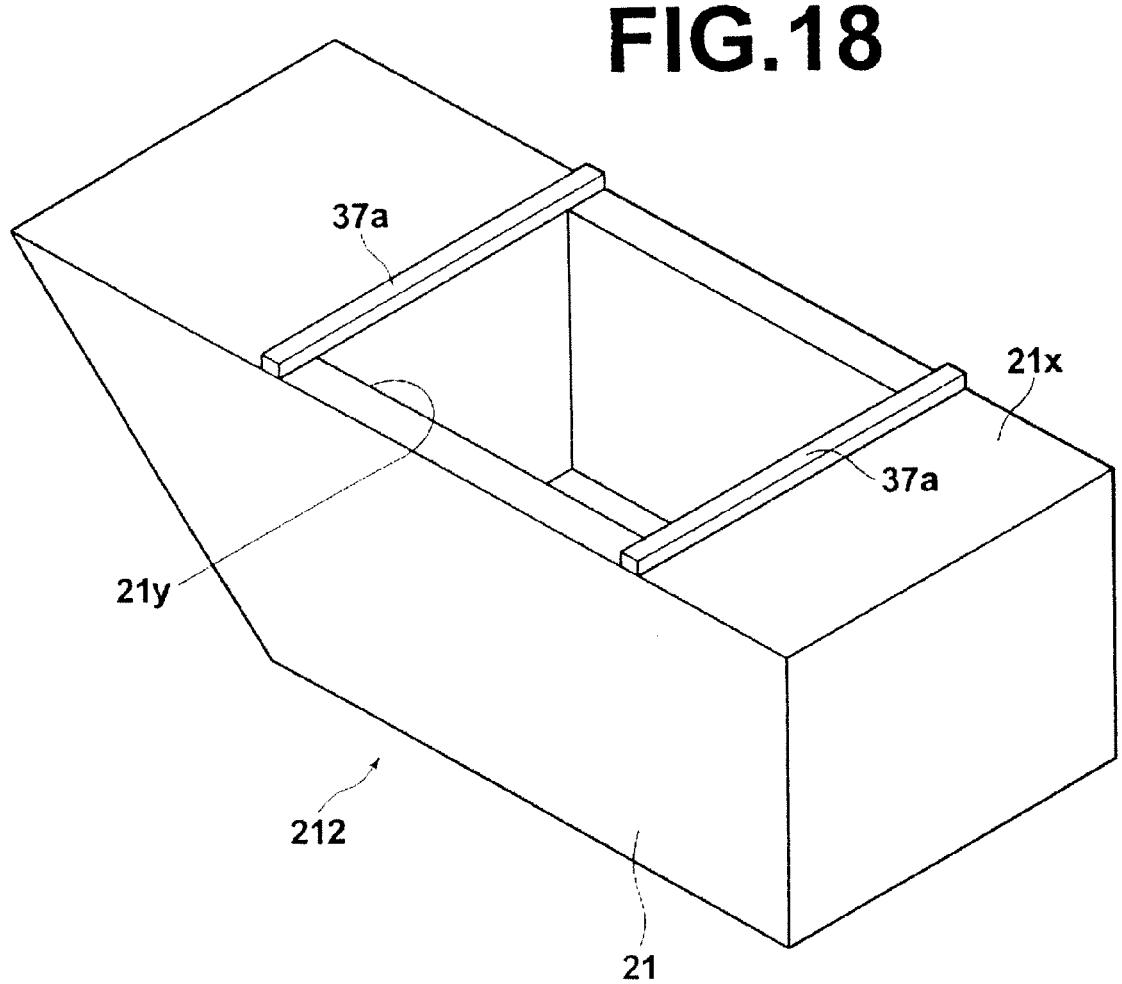
FIG. 18 is a partially sectional perspective view that illustrates a lens unit according to a thirteenth embodiment of the present invention.

Next, a lens unit 212 according to a thirteenth embodiment of the present invention will be described with reference to FIG. 18. The lens unit 212 differs from the lens unit 210 of FIG. 16 in that another rail shaped abutting portion 37a is provided instead of the abutting protrusion 37c. In this case as well, the same advantageous effects as those obtained by the lens unit 210 can be obtained, due to the operation of the two abutting portions 37a.

Figure 19:
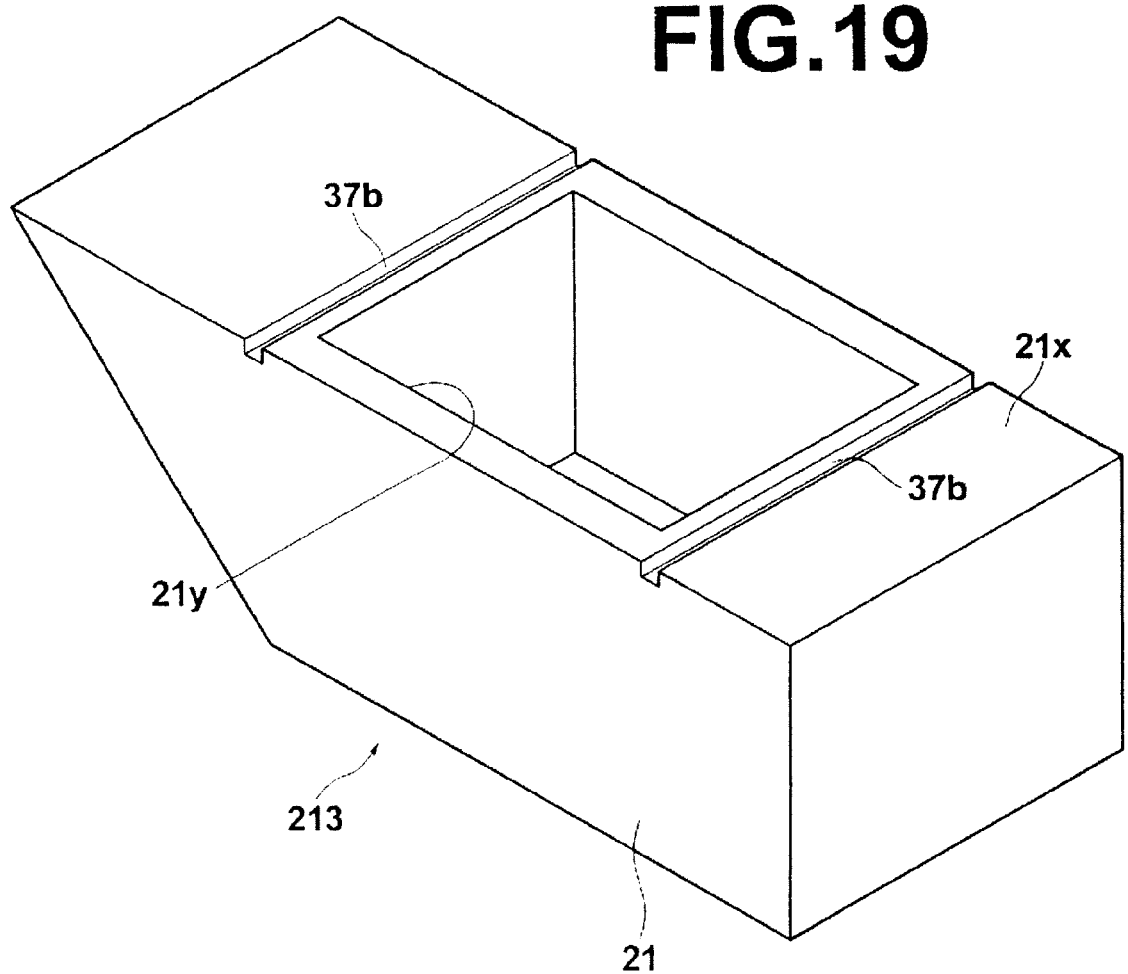
FIG. 19 is a partially sectional perspective view that illustrates a lens unit according to a fourteenth embodiment of the present invention.

Next, a lens unit 213 according to a fourteenth embodiment of the present invention will be described with reference to FIG. 19. The lens unit 213 differs from the lens unit 212 of FIG. 18 in that two abutting portions 37b in the form of elongate grooves are provided instead of the two rail shaped abutting portions 37a. Although not shown in FIG. 19, the flange 28 of the optical path extending member 27 to be employed here will have two of the rail shaped abutting portions 28b illustrated in FIG. 17. In this case as well, the same advantageous effect of enabling accurate positioning of the optical path extending member 27, as in the embodiment illustrated in FIG. 17.

Figure 20:
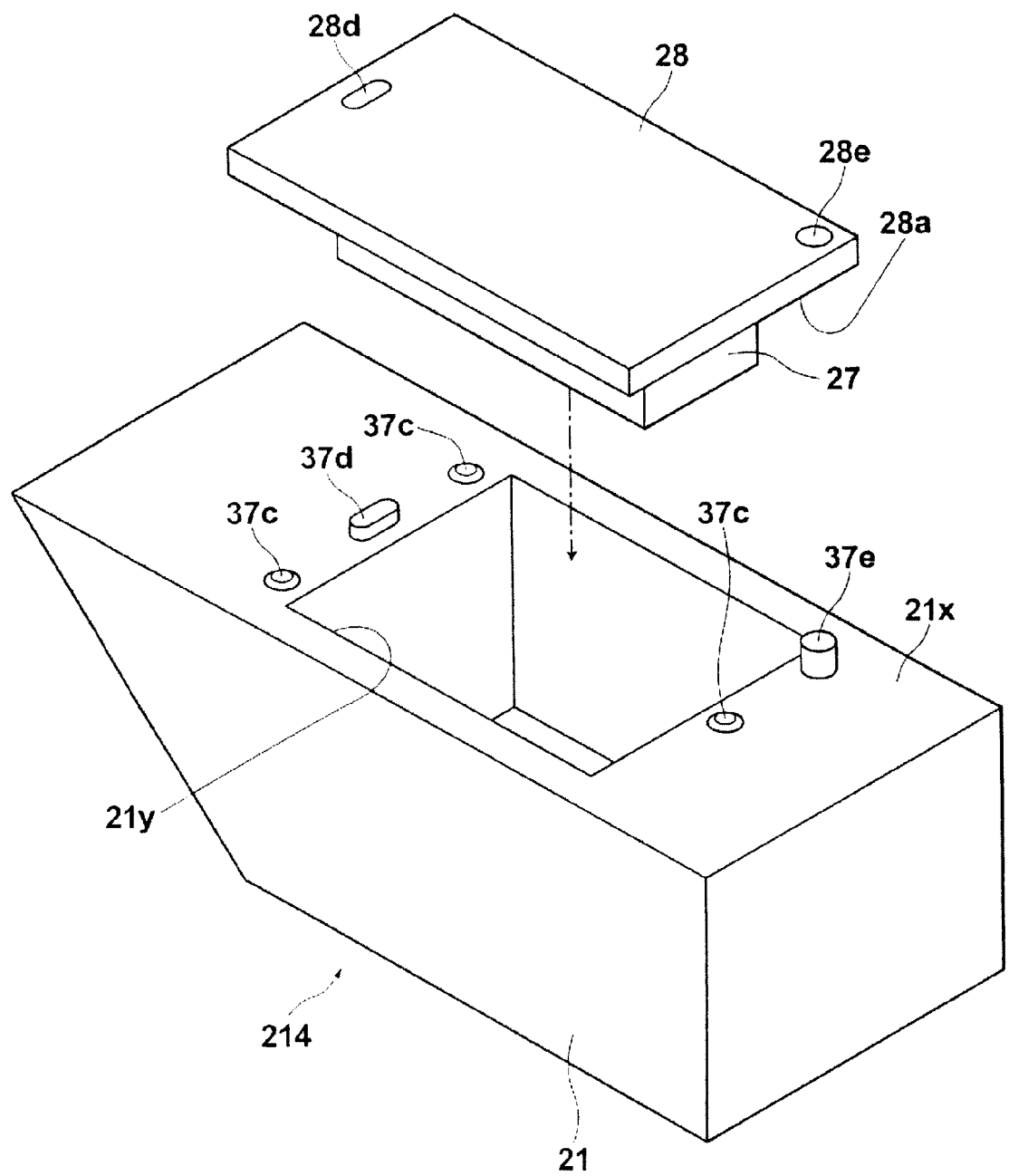
FIG. 20 is a partially sectional perspective view that illustrates a lens unit according to a fifteenth embodiment of the present invention.

Next, a lens unit 214 according to a fifteenth embodiment of the present invention will be described with reference to FIG. 20. In the lens unit 214, the opening 21y is formed within the wall 21x. Three abutting protrusions 37c, an oval engaging portion 37d, and a circular engaging portion 37e are formed on the wall 21x about the periphery of the opening 21y.

The optical path extending member 27 to be employed here is a parallelepiped which is basically the same as that illustrated in FIG. 15, except that the flange 28 is fixed thereon. An oval engaging aperture 28d and a circular engaging aperture 28e, into which the oval engaging portion 37d and the circular engaging portion 37e are respectively fitted tightly, are formed in the flange 28.

The optical path extending member 27 is placed within the lens barrel 21 through the opening 21y, with the side thereof having the flange 28 fixed thereon up. At this time, the optical path extending member 27 is positioned by the underside 28a of the flange 28 abutting the abutting portion 37a and the abutting protrusion 37c. In this case as well, it becomes possible to position the optical path extending member 27 in a state in which the optical axis thereof is matched with the central axis of the lens barrel 21. In addition, because the engaging portions 37d and 37e are respectively fitted within the engaging apertures 28d and 28e at this time, rotation of the flange 28, that is, the optical path extending member 27, within a plane parallel to the underside 28a of the flange can be prevented.

Figure 21:
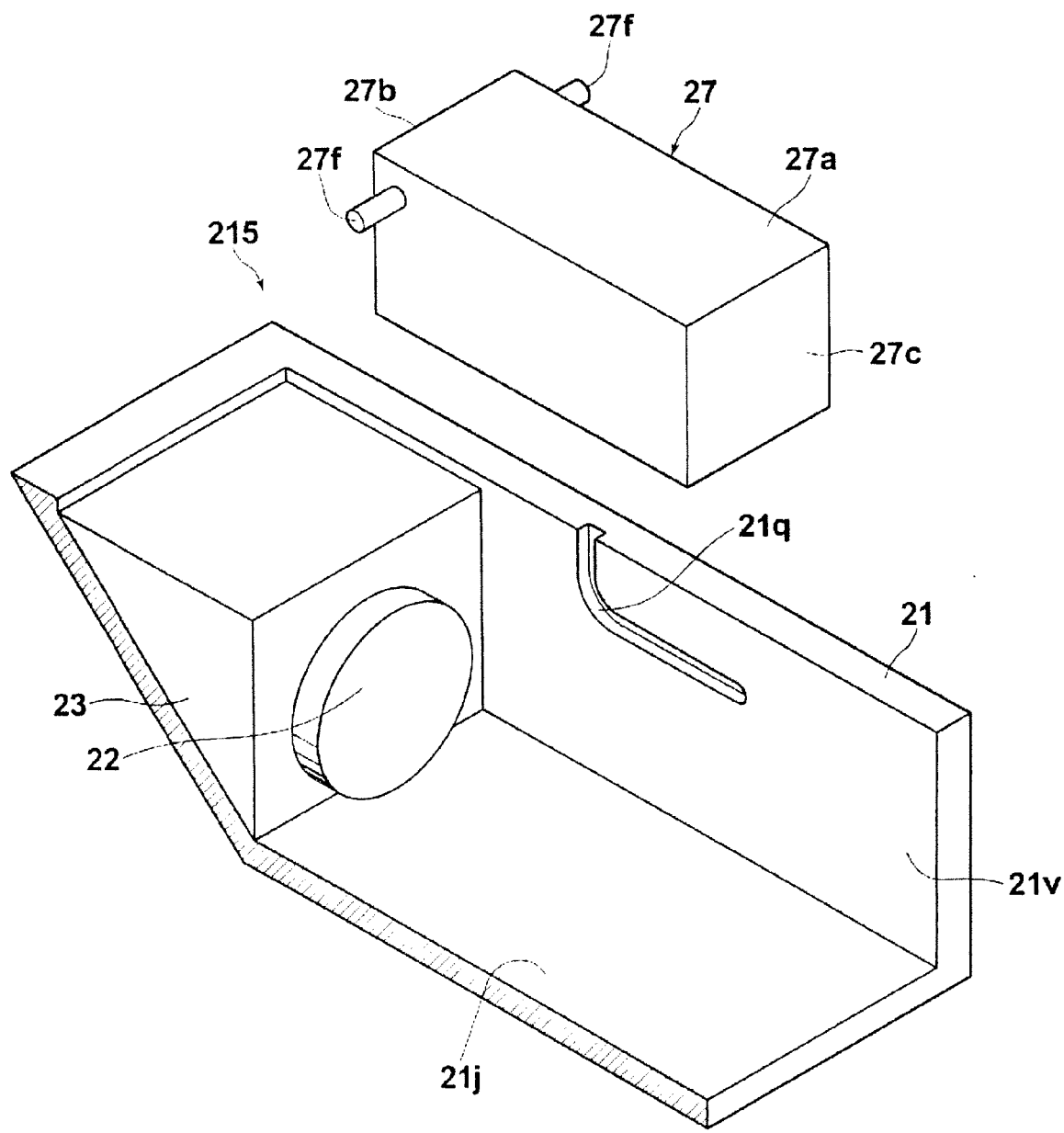
FIG. 21 is a partially sectional perspective view that illustrates a lens unit according to a sixteenth embodiment of the present invention.

Next, a lens unit 215 according to a sixteenth embodiment of the present invention will be described with reference to FIG. 21. In the lens unit 215, a guide groove 21q is formed in each of the two walls 21v, of only which one is shown in FIG. 21. The optical path extending member 27 to be employed here has a pair of positioning pins 27f, each of which protrudes from a pair of opposing side surfaces thereof.

When the optical path extending member 27 is mounted in the lens barrel 21, the pair of positioning pins 27f are inserted into the guide grooves 21q from above. Then, the optical path extending member 27 is moved until the positioning pins 27f reach the ends of the guide grooves 21q. In this case as well, it becomes possible to position the optical path extending member 27 in a state in which the optical axis thereof is matched with the central axis of the lens barrel 21.

Figure 22:
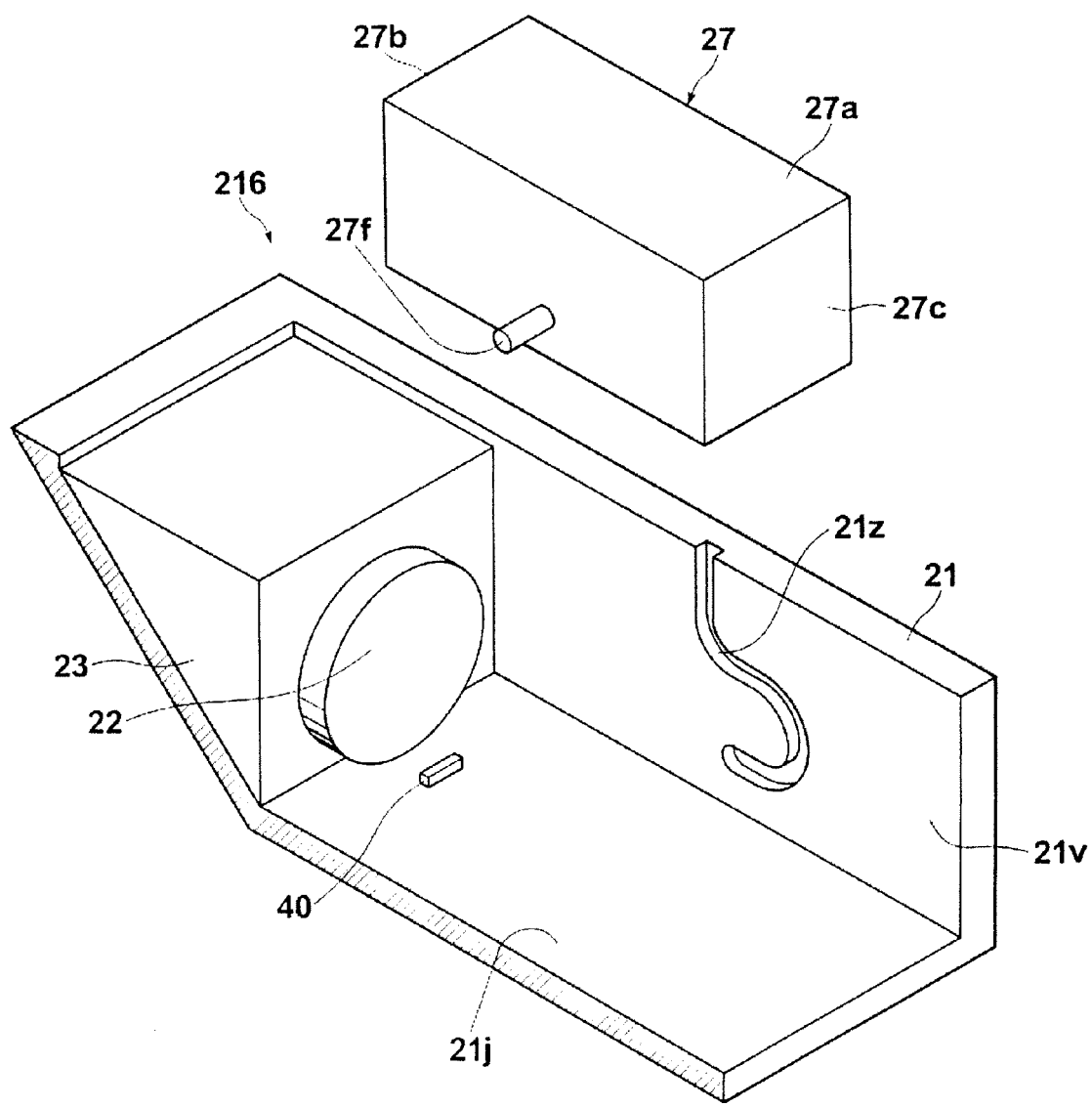
FIG. 22 is a partially sectional perspective view that illustrates a lens unit according to a seventeenth embodiment of the present invention.

Next, a lens unit 216 according to a seventeenth embodiment of the present invention will be described with reference to FIG. 22. The shapes of the guide grooves of the lens unit 216 differ from those of the lens unit 215 of FIG. 21. In the seventeenth embodiment, grooves 21z are formed in a direction that leads away from the lens 22, then in a direction that returns toward the lens 22. By providing the guide grooves 21z in this manner, it becomes possible to move the optical path extending member 27 held within the lens barrel 21 in the direction of the optical axis thereof. Therefore, it becomes possible to define the position' of the optical path extending member 27 in the direction of the optical axis thereof by the ends of the guide groves 21z, and also by causing the front end facet 27b of the optical path extending member 27 to abut a positioning protrusion 40 which is provided on the wall 21j.

What is claimed is:

1. A lens unit, comprising:
    a lens, through which light from an object enters;
    a lens barrel for holding the lens;
    an optical path extending member provided within the lens barrel toward the rear of the lens, for extending the focal point of the lens toward the rear side thereof to enable adjustment of positions of the lens to a predetermined state, based on observation results obtained after observing a focal image of the lens with a microscope in a state that the optical path extending member is provided in the lens barrel;
    a receiving portion having a receiving surface, for receiving a front end facet of the optical path extending member within the lens barrel that faces toward the lens, formed at a portion of the lens barrel; and
    a mounting portion positioned further rearward from a rear end facet of the optical path extending member, having a guide insertion aperture that extends in a direction perpendicular to the receiving surface, and a mounting surface that extends in a direction parallel to the receiving surface at the periphery of the guide insertion aperture, formed at a portion of the lens barrel.

2. A lens unit as defined in claim 1, wherein an opening for receiving the optical path extending member from a direction that intersects with the central axis of the lens barrel is formed in the lens barrel.

3. A lens unit, comprising:
    a lens, through which light from an object enters;
    a lens barrel for holding the lens;
    an optical path extending member provided within the lens barrel toward the rear of the lens, for extending the focal point of the lens toward the rear side thereof to enable adjustment of positions of the lens to a predetermined state, based on observation results obtained after observing a focal image of the lens with a microscope in a state that the optical path extending member is provided in the lens barrel;

a receiving portion having a receiving surface, for receiving a side surface that perpendicularly intersects a front end facet of the optical path extending member within the lens barrel that faces toward the lens, formed at a portion of the lens barrel; and a mounting portion positioned further rearward from a rear end facet of the optical path extending member, having a guide insertion aperture that extends in a direction parallel to the receiving surface, and a mounting surface that extends in a direction perpendicular to the receiving surface at the periphery of the guide insertion aperture, formed at a portion of the lens barrel.

4. A lens unit as defined in claim 3, wherein an opening for receiving the optical path extending member from a direction that intersects with the central axis of the lens barrel is formed in the lens barrel.

5. A lens unit, comprising:
a lens, through which light from an object enters;
a lens barrel for holding the lens;
an optical path extending member provided within the lens barrel toward the rear of the lens, for extending the focal point of the lens toward the rear side thereof to enable adjustment of positions of the lens to a predetermined state, based on observation results obtained after observing a focal image of the lens with a microscope in a state that the optical path extending member is provided in the lens barrel;

a receiving portion having a receiving surface, which is substantially perpendicular to the central axis of the lens barrel, formed at a portion of the lens barrel; and a mounting portion positioned further rearward from a rear end facet of the optical path extending member, having a guide insertion aperture that extends in a direction perpendicular to the receiving surface, and a mounting surface that extends in a direction parallel to the receiving surface at the periphery of the guide insertion aperture, formed at a portion of the lens barrel.

6. A lens unit as defined in claim 5, wherein an opening for receiving the optical path extending member from a direction parallel to the central axis of the lens barrel is formed in the lens barrel.

7. A lens unit, comprising:
a lens, through which light from an object enters;
a lens barrel for holding the lens;
an optical path extending member provided within the lens barrel toward the rear of the lens, for extending the focal point of the lens toward the rear side thereof to enable adjustment of positions of the lens to a predetermined state, based on observation results obtained after observing a focal image of the lens with a microscope in a state that the optical path extending member is provided in the lens barrel; and a protrusion for positioning the optical path extending member by contacting the peripheral surface thereof, formed at a portion of the lens barrel.

8. A lens unit, comprising:
a lens, through which light from an object enters;
a lens barrel for holding the lens;
an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and a plurality of flange receiving grooves, for positioning the optical path extending member by receiving a plurality of flanges which are fixed on the optical path extending member, formed in portions of the lens barrel.

9. A lens unit, comprising:
a lens, through which light from an object enters;
a lens barrel for holding the lens;
an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel;

a flange receiving groove, for positioning the optical path extending member by receiving a single flange which is fixed on the optical path extending member, formed in a portion of the lens barrel; and a receiving portion, for positioning the optical path extending member by receiving the peripheral surface thereof, formed at a portion of the lens barrel.

10. A lens unit, comprising:
a lens, through which light from an object enters;
a lens barrel for holding the lens;
an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and a plurality of flange receiving grooves located at different locations, for positioning the optical path extending member by receiving a single flange which is fixed thereon, formed in portions of the lens barrel.

11. A lens unit, comprising:
a lens, through which light from an object enters;
a lens barrel for holding the lens;
an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel; and a receiving hole formed in a portion of the lens barrel, for positioning the optical path extending member, which is substantially formed as a rectangular column, by receiving the optical path extending member in a tightly fitting manner.

12. A lens unit, comprising:
a lens, through which light from an object enters:
a lens barrel for holding the lens;
an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel;

a first set of a plurality of protrusions, for positioning a first side surface of the optical path extending member by abutting the first side surface, formed at a portion of the lens barrel; and a second set of a plurality of protrusions, for positioning a second side surface of the optical path extending member that extends in a direction that intersects with the first side surface by abutting the second side surface, formed at a portion of the lens barrel.

13. A lens unit as defined in claim 12, wherein:

three protrusions are formed in each of the first set of protrusions and the second set of protrusions.

14. A lens unit, comprising:

a lens, through which light from an object enters;

a lens barrel for holding the lens;

an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel;

an opening for receiving the optical path extending member, which has a flange fixed thereon, from a direction that intersects with the central axis of the lens barrel being formed in the lens barrel; and an abutting portion, for positioning the optical path extending member by abutting the flange, formed at the peripheral portion of the opening.

15. A lens unit as defined in claim 14, wherein:

an engaging portion is formed on the flange; and at least one engaging portion for engaging the engaging portion of the flange is formed at the peripheral portion of the opening in the lens barrel.

16. A lens unit, comprising:

a lens, through which light from an object enters;

a lens barrel for holding the lens;

an optical path extending member provided within the lens barrel toward the rear of the lens, for extending the focal point of the lens toward the rear side thereof to enable adjustment of the positions of the lens to a predetermined state, based on observation results obtained after observing a focal image of the lens with a microscope in a state that the optical path extending member is provided in the lens barrel;

a positioning pin formed on a side surface of the optical path extending member; and a guide groove, for receiving the positioning pin and guiding the optical path extending member to a predetermined position, formed in a portion of the lens barrel.

* * * * *